United States Patent

Ogawa

[11] Patent Number: 5,572,492
[45] Date of Patent: Nov. 5, 1996

[54] OPTICAL RECORDING AND REPRODUCING METHOD UTILIZING RECORDING MEDIUM INCLUDING RECORDING REGIONS FORMED BY LOCALIZED CO-MELTED MIXTURE OF NON-REACTANT MATERIALS

[75] Inventor: Yoshihiro Ogawa, Sagamihara, Japan

[73] Assignee: Canon Kabushiki Kaisha, Tokyo, Japan

[21] Appl. No.: 468,197

[22] Filed: Jun. 6, 1995

Related U.S. Application Data

[62] Division of Ser. No. 360,130, Dec. 20, 1994, which is a continuation of Ser. No. 998,778, Dec. 29, 1992, abandoned, which is a continuation of Ser. No. 716,962, Jun. 18, 1991, abandoned.

[30] Foreign Application Priority Data

Jun. 19, 1990 [JP] Japan ................... 2-158746
Jun. 19, 1990 [JP] Japan ................... 2-158749

[51] Int. Cl.⁶ .................... G11B 13/00; G11B 3/70
[52] U.S. Cl. .................... 369/14; 369/288; 430/271.1; 430/273.1
[58] Field of Search .................... 369/275.1, 284, 369/281, 288, 272, 274, 100, 14; 430/270, 269, 268, 270.1, 270.13, 271.1, 273.1

[56] References Cited

U.S. PATENT DOCUMENTS

| | | | |
|---|---|---|---|
| 3,740,761 | 6/1973 | Fechter | 346/135.1 |
| 4,340,655 | 7/1982 | Hollister et al. | 430/14 |
| 4,463,083 | 7/1984 | Kitajima et al. | 346/135.1 |
| 4,477,819 | 10/1984 | Lee et al. | 430/273 |
| 4,555,472 | 11/1985 | Katagiri et al. | 430/278 |
| 4,626,496 | 12/1986 | Sato | 430/270 |
| 4,714,667 | 12/1987 | Sato et al. | 430/270 |
| 4,752,544 | 6/1988 | Sato et al. | 429/188 |
| 4,772,582 | 9/1988 | DeBoer | 503/227 |
| 4,874,205 | 11/1989 | Suzuki | 297/378.12 |
| 4,891,305 | 1/1990 | Oba et al. | 430/495 |
| 4,910,107 | 3/1990 | Kawada et al. | 430/21 |
| 4,913,949 | 4/1990 | Steininger et al. | 428/64.9 |
| 4,933,221 | 6/1990 | Nishimura et al. | 428/64.9 |
| 4,944,981 | 7/1990 | Oguchi et al. | 428/64.9 |
| 5,002,812 | 3/1991 | Umehara et al. | 428/64.9 |
| 5,026,623 | 6/1991 | Imataki et al. | 430/270 |
| 5,079,128 | 1/1992 | Katagiri et al. | 430/269 |
| 5,185,233 | 2/1993 | Santo | 430/270 |
| 5,341,358 | 8/1994 | Kobayashi et al. | 369/100 |

FOREIGN PATENT DOCUMENTS

| | | |
|---|---|---|
| 0278763 | 7/1988 | European Pat. Off. . |
| 0289352 | 11/1988 | European Pat. Off. . |
| 2139992 | 1/1973 | France . |
| 2566159 | 12/1985 | France . |
| 3537539 | 4/1986 | Germany . |
| 60-36188 | 2/1985 | Japan . |
| 63-197040 | 8/1988 | Japan . |

OTHER PUBLICATIONS

Bartolini, et al., "Optical Engineering", vol. 15, No. 2, pp. 99–108 (1976).

*Primary Examiner*—Tan Dinh
*Attorney, Agent, or Firm*—Fitzpatrick, Cella, Harper & Scinto

[57] ABSTRACT

A record blank for use in optical recording is formed by disposing in laminate form on a substrate a recording layer and a supplementary record layer, optionally with a separating layer interposed between the recording layer and the supplementary record layer. On irradiation with a recording light beam having a prescribed wavelength, in accordance with recording information, the recording layer and supplementary record layer locally form a co-melted mixture state (optically through breakage of the separating layer, if present) thus resulting in an optically detectable change in the record blank detectable by a reproducing light beam which has a wavelength the same as or different from the wavelength of the recording light beam.

11 Claims, 6 Drawing Sheets

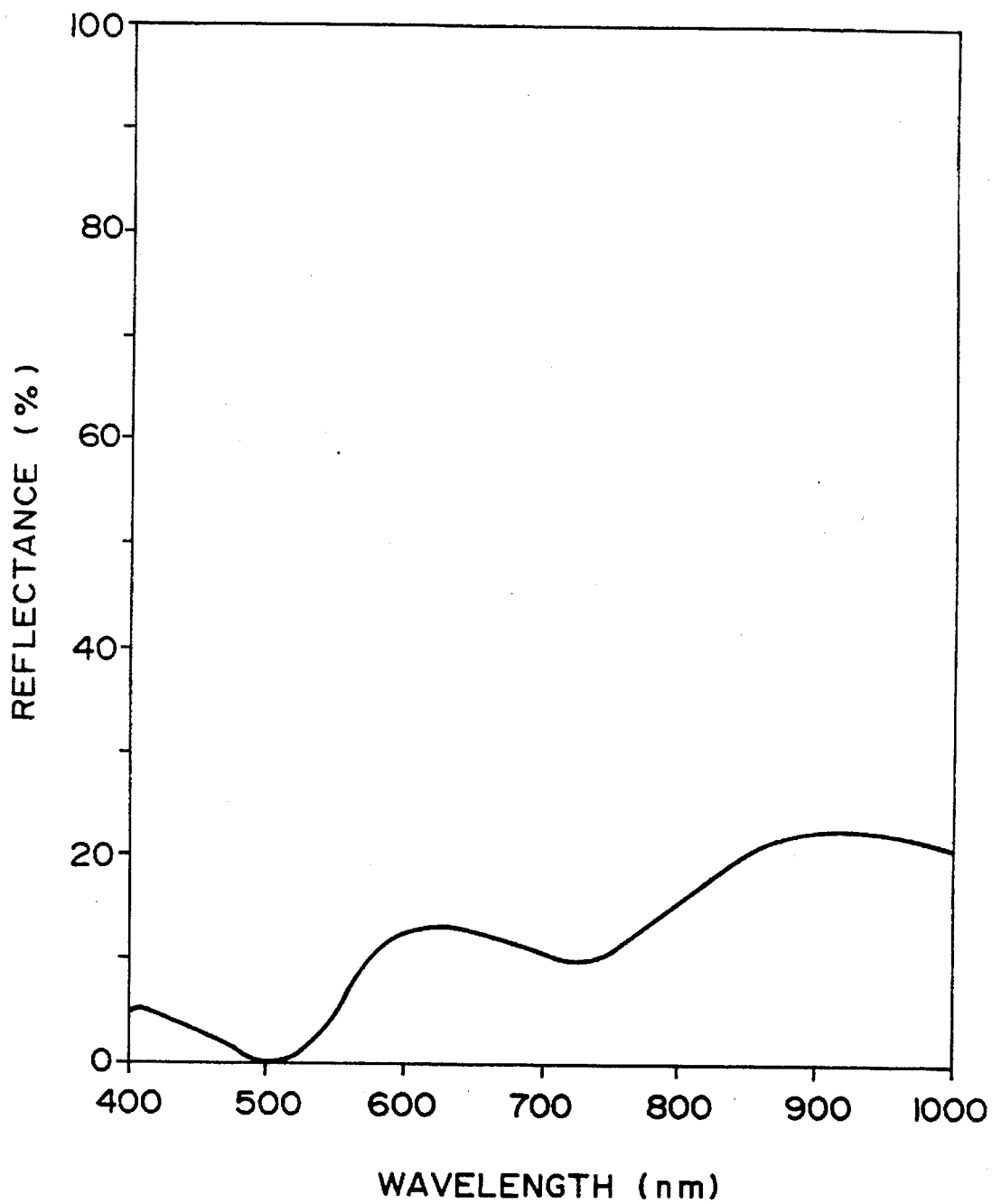
F I G. 7

5,572,492

OPTICAL RECORDING AND REPRODUCING METHOD UTILIZING RECORDING MEDIUM INCLUDING RECORDING REGIONS FORMED BY LOCALIZED CO-MELTED MIXTURE OF NON-REACTANT MATERIALS

This application is a division of application Ser. No. 08/360,130 filed Dec. 20, 1994, which is a continuation of Ser. No. 07/998,778 filed Dec. 29, 1992 abandoned, which is a continuation of application Ser. No. 07/716,962 filed Jun. 18, 1991, abandoned.

FIELD OF THE INVENTION AND RELATED ART

The present invention relates to an optical recording medium (i.e., a record blank for use in optical recording or an information record obtained as a result) capable of recording at a high sensitivity and an excellent contrast, and recording and reproducing methods using the optical recording medium.

Hitherto, there have been known reversal types of optical recording method as described in e.g., Optical Engineering, Vol. 15, No. 2, March–April, 1976, page 99 - , "Review and Analysis of Optical Recording Media", inclusive of a type wherein a deformation, such as pits or bubbles, is caused in a recording layer and a type wherein an optical property of a recording layer is changed, respectively by irradiating the recording layer of an optical recording medium with a light beam, such as laser light.

An optical recording medium of the type causing a deformation in the recording layer may be obtained by forming on a substrate a film of a low-melting point metal, such as Te, Bi, Sn, Sb or In; an organic coloring matter, such as a dye or pigment of cyanine-type, squalium-type, phthalocyanine-type, tetradehydrocholine-type, polymethine-type, naphthoquinone-type or benzenedithiol-nickel complex; or a composite of such an organic coloring matter and metal.

The optical recording layer of such a film is irradiated with a light beam, which is converted into a heat energy depending on the rate of absorption thereof, and the recording layer is locally melted or sublimated in the heat mode to form a record pit.

Among the recording layer-forming materials, organic coloring matters have called attention in recent years because of their inexpensiveness. More specifically, the recording layer of an organic coloring matter can be formed by application together with a solvent on a substrate and is more suited for mass production than the recording layer of a low melting point metal.

A record pit of such a recording layer comprising an organic coloring matter shows a lowered reflectivity due to decoloration caused by thermal decomposition of the coloring matter and also an optical scattering effect due to the record pit formed by the deformation, so that a reflected quantity of incident information reproducing laser light is changed at the record pit to allow detection of the recorded information.

In this type of optical recording medium, however, an organic coloring matter showing an absorptivity for a long-wavelength light emitted from a semiconductor laser which is generally used as a recording light source, requires a recording energy input of about 100 mJ/cm$^2$ or more by a laser light with a wavelength of, e.g., 830 nm in order to obtain a record at a sufficient S/N ratio. Further, a higher recording speed for an increased data transfer speed requires a higher power of laser. Accordingly, in view of the durability and applicability of such a high-power laser and other related hardware, it is also required to increase the sensitivity of the recording layer.

Incidentally, an optical card having an appearance of a card among such optical recording media is required to have a thickness in the range of 0.74–0.76 mm as a standard of ISO (International Organization for Standardization). On the other hand, in order to minimize the influence of dust or scar on the surface of a substrate of a recording medium, a thicker substrate is more advantageous and a thickness of about 0.4–0.6 mm is suitable. Further, a protective sheet or layer having a thickness of about 0.15–0.4 mm is required. Accordingly, in order to obtain an optical card having the above-described thickness, it is difficult to adopt an air-sandwich structure wherein a hollow layer having a thickness of about 0.5–1 mm is disposed on the recording layer on the substrate and a protective sheet is further disposed thereon.

As a result, it is inevitable to adopt an adhesived structure wherein the recording layer is laminated with a protective sheet or layer by the medium of an adhesive layer.

However, when such an adhesived recording medium is subjected to optical recording using laser light, heat generated by irradiation with laser light quickly diffuses through the adhesive layer, the thermal deformation required for formation of a record pit by laser light irradiation is suppressed, and the thermal decomposition of the coloring matter is suppressed because of the adhesived structure, compared with a recording medium of air-sandwich structure. As a result, the recording sensitivity of an adhesived recording medium is lowered to $1/3$–$1/5$ of that of an air-sandwich recording medium.

In order to solve the above problem, our research group has proposed an optical recording medium having an increased recording sensitivity, which has a recording layer comprising an organic coloring matter and a compound generating radicals on heat application so as to cause decoloration at a photo-irradiated part through reaction between the coloring matter and the radicals. However, in the thus formed information record, the reaction of the coloring matter at a record pit is not considered to have been completed so that the record contrast is liable to change with time. Further, a decolored region is liable to be developed around a record pit, resulting in an enlarged pit.

On the other hand, Novotony and Alexandru have disclosed a recording method wherein a heat-resistance organic coloring matter layer disposed on a resinous substrate is irradiated with a laser beam to cause the coloring matter to diffuse into the substrate to provide a different spectral pattern. In this method utilizing a spectral pattern change due to diffusion of an optical coloring matter into a substrate of an optical recording medium, it has been difficult to provide a record having a sufficient contrast, e.g., 0.4 or higher in the case of an optical card.

SUMMARY OF THE INVENTION

An object of the present invention is to provide an optical recording medium (a record blank and an information record) having a high recording sensitivity and an excellent durability.

Another object of the present invention is to provide an optical recording method capable of providing a record at a high S/N ratio.

Another object of the present invention is to provide an optical reproducing method capable of reproducing a record at an excellent contrast.

According to the present invention, there is provided a record blank for use in optical recording of the type using a recording light beam having a prescribed wavelength and a reproducing light beam having a wavelength which is the same as or different from the prescribed length;

The record blank comprises a substrate and a recording layer and a supplementary record layer disposed in lamination on the substrate. The recording layer includes an organic coloring matter. The supplementary record layer forms a co-melted mixture with the organic coloring matter on irradiation with the recording light beam to cause an optically detectable change in the record blank.

The present invention further provides an optical recording method using the record blank, an information record thus produced, and an optical reproducing method using the information record.

In the optical recording method using the record blank according to the present invention, the 0 recording layer and the supplementary record layer are caused on irradiation with a light to form a co-melted mixture state wherein the structure of the organic coloring matter is substantially retained but an interaction is caused between the organic coloring matter and a polar group contained in the supplementary record layer, more specifically between a π-electron of the coloring matter and the polar group, thus shifting the absorption band of the coloring matter to a longer wavelength side (bathochromic effect) or a shorter wavelength side (hypsochromic effect) to provide a different spectral characteristic compared with that of the organic coloring matter recording layer for recording. This is unlike a previously proposed method wherein an organic coloring matter is reacted with radicals on photo-irradiation. According to the present invention, the co-melted mixture state of the recording layer and the supplementary record layer is instantaneously formed by local irradiation with a recording light beam and fixed by rapid cooling on removal of the light beam. The thus formed mixture record state is thermally stable and the resultant record is stable with time, so that an information record with a good storage stability is attained.

Further, in the present invention, the function of interacting with an organic coloring matter is separated from the substrate and transferred to the supplementary record layer so that a co-melted mixture state providing a change in optical characteristic optimum for recording is given to provide a high performance optical recording medium.

These and other objects, features and advantages of the present invention will become more apparent upon a consideration of the following description of the preferred embodiments of the present invention taken in conjunction with the accompanying drawings, wherein like parts are denoted by like reference numerals.

BRIEF DESCRIPTION OF THE DRAWINGS

FIG. 7 is a graph showing a relationship between reflectance and wavelength by a 1000 Å-thick film of the optical coloring matter used in Example 1.

DETAILED DESCRIPTION OF THE INVENTION

Figure 1A:
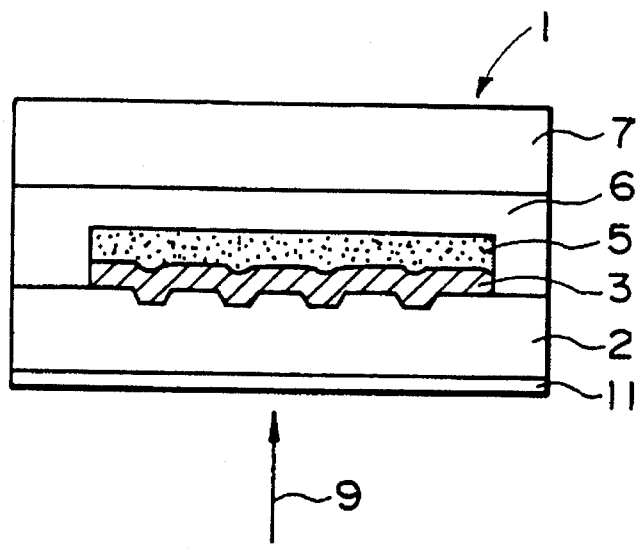
FIGS. 1A and 1B are respectively schematic sectional views showing an optical recording medium (record blank) according to the present invention.

FIG. 1A is a schematic sectional view of an embodiment of the optical recording medium (record blank) according to the present invention. Referring to FIG. 1A, an optical recording medium includes a substrate 2, a recording layer 3 and a supplementary record layer 5 disposed in this order on the substrate 2 and laminated with a protective sheet or substrate 7 by the medium of an adhesive layer 6. The substrate 2 has a preformat unevenness pattern and backed with a hard coat layer 11. The recording layer 3 comprises an organic coloring matter, and the supplementary record layer 5 comprises a polymer containing a polar group.

In a recording method using the optical recording medium, the optical recording medium 1 is irradiated with a recording light beam 9 to locally form a co-melted mixture of the recording layer 3 and the supplementary record layer 5 at least at the boundary between the recording layer 3 and the supplementary record layer, so that the spectral characteristic of the organic coloring matter in response to a reproducing light beam is changed by interaction with the polar group contained in the supplementary record layer.

The co-melted mixture of the recording layer and the supplementary record layer referred to herein is a state of mixture of the materials constituting the recording layer and the supplementary record layer caused thermally by irradiation with a recording light beam. It does not necessarily form a uniform mixture on a molecular level and may include a diffusion or dispersion state wherein one of the materials constituting the recording layer on the supplementary record layer is diffused or dispersed into the other layer so far as to effect a substantial change in absorption characteristic, particularly a shift in the absorption band, of the organic coloring matter due to interaction with a polar group of the material constituting the supplementary record layer. This is substantially different from decoloration (i.e., attenuation of absorption characteristic) of an organic coloring matter caused by reaction with radicals. The co-melted mixture state providing the interaction between the π-electrons of the coloring matter and the polar group is thermally and energetically, effected so that an information record of a high-performance having an excellent storage stability can be provided.

It is generally preferred that the supplementary record layer 5 is disposed on the opposite side of the light incidence with respect to the recording layer 3 so as to provide a better recording sensitivity and/or reproducing contrast.

Figure 1B:
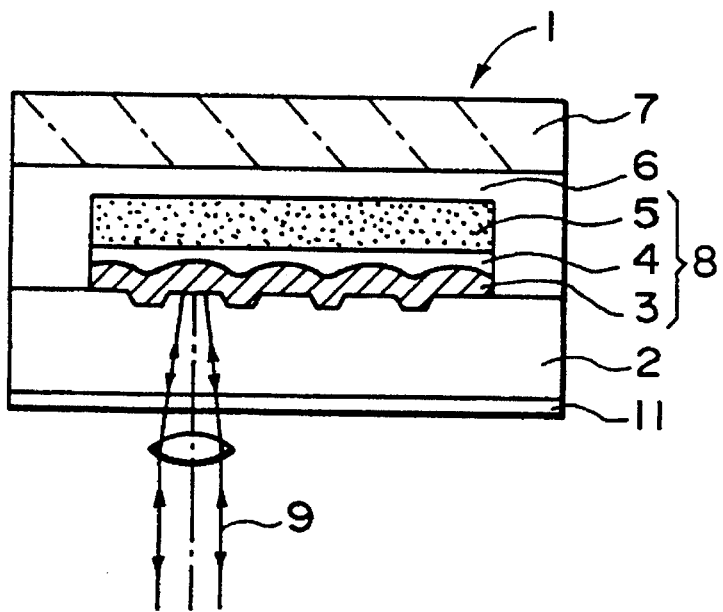
Figure 2:
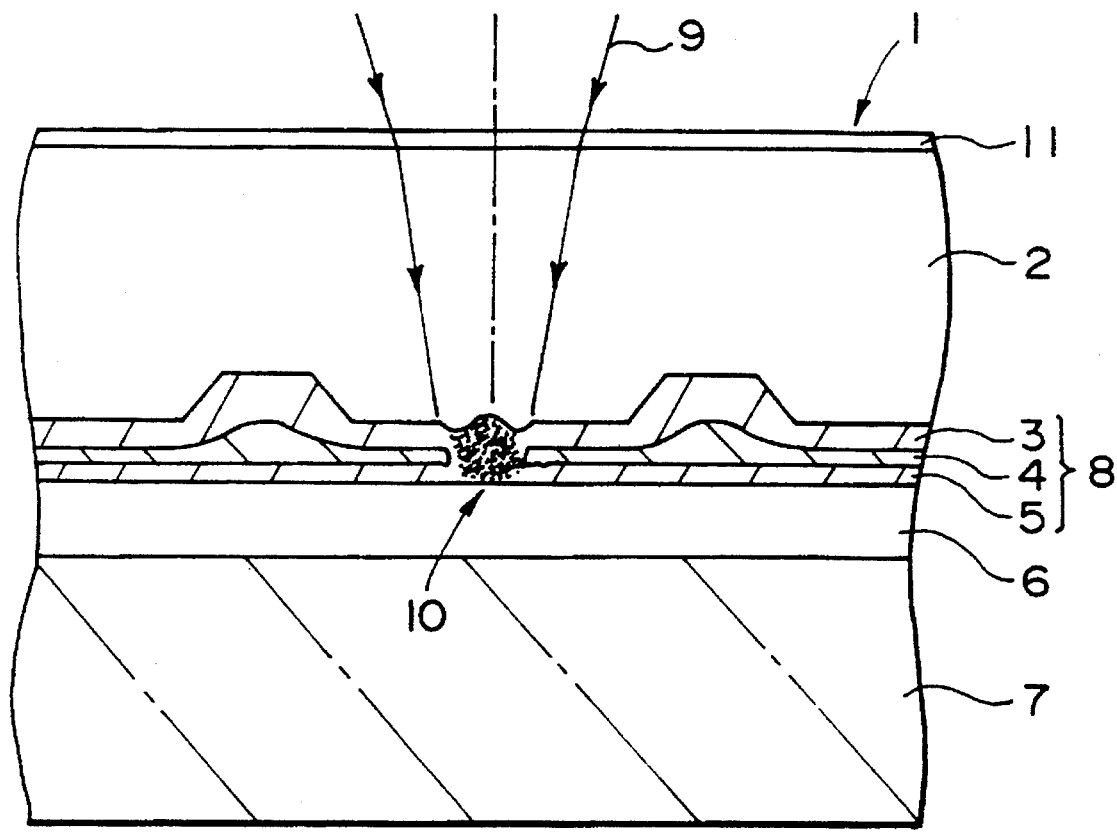
FIG. 2 is an enlarged schematic sectional view showing a record part of an optical recording medium according to the present invention.

FIG. 1B is schematic sectional view of another embodiment of the optical recording medium (record blank) according to the present invention. Referring to FIG. 1B, this embodiment is different from the one shown in FIG. 1A in that a separating layer 4 is disposed between the recording layer 3 and the supplementary record layer 5. The recording layer 3, the separating layer 4 and the supplementary record layer 5 in combination forms a multi-layer laminate 8. The separating layer 4 ordinarily has a function of separating the recording layer 3 and the supplementary record layer 5 to prevent the interaction between these layers but, on irradiation with a recording light beam 9, is melted by the heat to be broken to allow the formation of a record part 10 (see, e.g., FIG. 2) comprising a co-melted mixture state of the recording layer 3 and the supplementary record layer 5 wherein the polar group in the supplementary record layer 5 acts on the organic coloring matter in the recording layer to shift the absorption band of organic coloring matter, thus resulting in a change in spectral characteristic optically detectable by a reproducing light beam.

The supplementary record layer 5 may preferably comprise a polymer containing a polar group acting on the optical coloring matter contained in the recording layer 3 to shift the absorption band of the coloring matter, so that the polymer is melted on irradiation with a recording light beam to form a co-melted mixture state with the organic coloring matter.

On the other hand, an organic coloring matter generally comprises conjugated double bond including π-electrons and is assumed to absorb or reflect light accompanied by movement of the π-electrons in its molecule. Thus, in the co-melted mixture state given by the present invention, the coloring matter and the polar group approach each other so that the polar group is assumed to hinder the movement of the π-electron, thus shifting the absorption band of the organic coloring matter to a shorter wavelength or a longer wavelength.

Examples of the polar group causing a shift to a shorter wavelength-side may include a carboxyl group, an amide group, an amino group and a hydroxyl group. On the other hand, the polar group causing a shift to a shorter wavelength may for example be a halogen or a halogen-containing group.

The polymer containing a polar group may include a polymer mixed or impregnated with a compound having such a polar group.

Specific examples of the polymer containing a polar group may include the following:

(1) Polyamides or polyesters in mixture with 2–30 wt. %, more preferably 5–10 wt. %, of a polar compound, such as maleic acid, phthalic acid, maleic anhydride, phthalic anhydride, terephthalic acid ester, aliphatic acid ester, or 5-fluoropropanol.

(2) Polymers having a relatively large free volume (such as cellulose derivatives and aromatic polyamides) impregnated with 5–30 wt. %, more preferably 10–20 wt. %, of a polar compound as described above.

A film of the mixture (1) above may be formed by melt-extruding the mixture of the polymer and the polar compound.

A film of the impregnated polymer (2) may be formed by solvent-casting. More specifically, the polymer is dissolved in an organic solvent containing 10–200 wt. % of a swelling agent, such as formamide, water, magnesium perchlorate, potassium perchlorate or potassium chloride, and the solution is applied by a doctor blade, etc., onto a glass substrate, followed by evaporation of the solvent, to form a porous film, which is then dipped within a polar compound, such as described above or a solution thereof, within a poor solvent for the above polymer.

A particularly preferred class of the polymers containing a polar group may be the mixtures of polyamides or polyesters with polar compounds, such as maleic acid, maleic anhydride, phthalic acid, phthalic anhydride, terephthalic acid ester and aliphatic acid esters. This class of polymers are preferred because they form a stable co-melted mixture with a cationic coloring matter as an optical coloring matter to cause a remarkable shift of the absorption band of the cationic coloring matter to a shorter wavelength side.

Examples of the organic coloring matter used in the recording layer may include: anthraquinone derivatives, particularly those having an indanthrene skeleton; dioxadine compounds and their derivatives, triphenodithiazine compounds, phenanthrene derivatives, polymethine-type compounds, cyanine-type compounds, merocyanine-type compounds, pyrylium-type compounds, xanthene-type compounds, triphenylmethane-type compounds, croconium-type coloring matters, azo coloring matters, crocones, azines, indigoids azulenes, squalium derivatives, sulfide dyes, and metal dithiolate complexes.

Among the organic coloring matters, the cationic coloring matters, represented by those of the polymethine-type and the cyanine-type are particularly preferred because they form a stable mixture state with the supplementary record layer, and the following enumerated cationic coloring matters are especially preferred because they form a stable co-melted mixture at an excellent recording sensitivity to cause a large change in spectral characteristic, thus providing a good contrast of recording.

Polymethine dye represented by Formula (I)

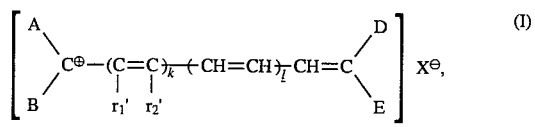

wherein A, B, D and E each represent a hydrogen atom or a group selected from a substituted or unsubstituted alkyl group, a substituted or unsubstituted alkenyl group, a substituted or unsubstituted aralkyl group, a substituted or unsubstituted aryl group, a substituted or unsubstituted styryl group and a substituted or unsubstituted heterocyclic group, $r_1'$ and $r_2'$ each represent a group selected from a hydrogen atom, a substituted or unsubstituted alkyl group, a substituted or unsubstituted cyclic alkyl group, a substituted or unsubstituted alkenyl group, a substituted or unsubstituted aralkyl group and a substituted or unsubstituted aryl group, k represents 0 or 1, $l$ represents 0, 1 or 2; and $X^{\ominus}$, an anion.

Dye represented by Formula (II):

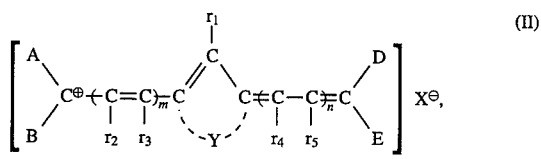

wherein A, B, D, E and $X^{\ominus}$ each are as defined above; $r_1$ to $r_5$ each represent a hydrogen atom, a halogen atom, a substituted or unsubstituted alkyl group or a substituted or unsubstituted aryl group; Y represents a divalent organic residue having a group of atoms necessary for completing a substituted or unsubstituted ring of 5 or 6 members; and m and n each represent 0, 1 or 2.

Dye represented by Formula (III):

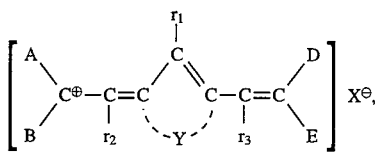

wherein A, B, D, E, $r_2$, $r_3$, Y and $X^\ominus$ are as defined above.

Dye represented by Formula (IV):

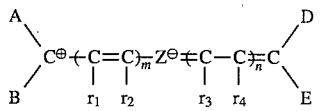

wherein A, B, D, E, $r_1$, $r_2$, $r_3$, $r_4$, m and n are as defined above, and $Z^\ominus$ represents

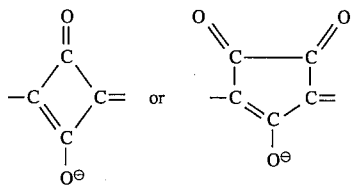

Azulenium dye represented by Formula (V), (VI) or (VII) shown below:

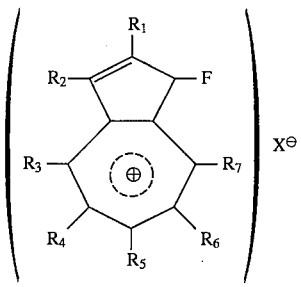  (V)

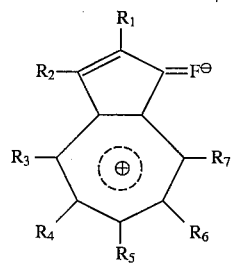  (VI)

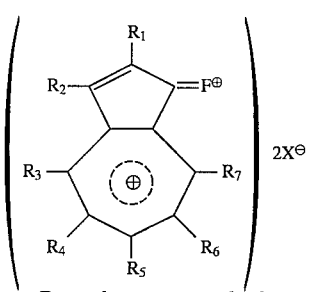  (VII)

Here, $R_1$ to $R_7$ each represent a hydrogen atom, a halogen atom (including a fluorine atom, a chlorine atom, a bromine atom and an iodine atom) or a monovalent organic residue. The monovalent organic residue can be selected from groups covering a wide range.

A substituted or unsubstituted condensed ring may also be formed by at least one combination of the combinations of $R_1$ and $R_2$, $R_2$ and $R_3$, $R_3$ and $R_4$, $R_4$ and $R_5$, $R_5$ and $R_6$ and $R_6$ and $R_7$. The condensed ring includes condensed rings of 5, 6 or 7 members, including aromatic rings (such as benzene, naphthalene, chlorobenzene, bromonbenzene, methyl benzene, ethylbenzene, methoxybenzene and ethoxybenzene), heterocyclic rings (such as a furan ring, a benzofuran ring, a pyrol ring, a thiophene ring, a pyridine ring, a quinoline ring and a thiazole ring) and aliphatic rings (such as dimethylene, trimethylene and tetramethylene).

$X^\ominus$ is as defined above and represents an anion.

F represents a divalent organic residual group combined by a double bond. Specific examples of coloring matters in the present invention, containing such F, may includes those represented respectively by Formulas (I) to (II). Provided that $Q^\oplus$ in the formula represents an azulenium salt nucleus shown below, and the right side excluding $Q^\oplus$ in the formula indicates F.

Azulenium salt nucleus ($Q^\oplus$);

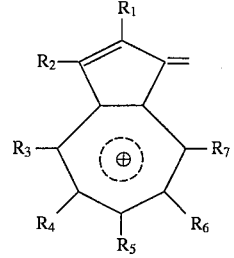

Formula:

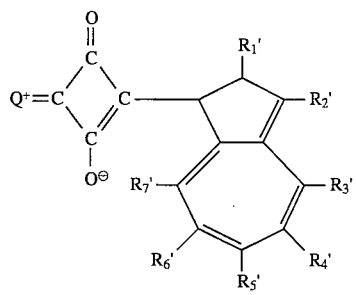  (1)

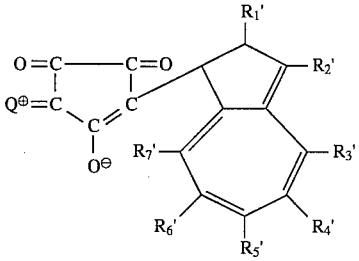  (2)

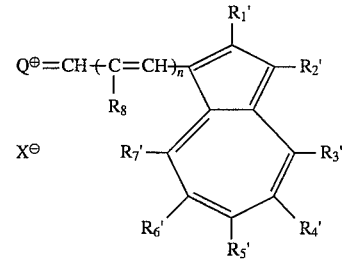  (3)

$R_1'$ to $R_7'$ are as defined for $R_1$ to $R_7$.

Also, the azulenium salt nucleus represented by $Q^\oplus$ and the azulene salt nucleus at the right side in the above formula (3) may be symmetrical or unsymmetrical.

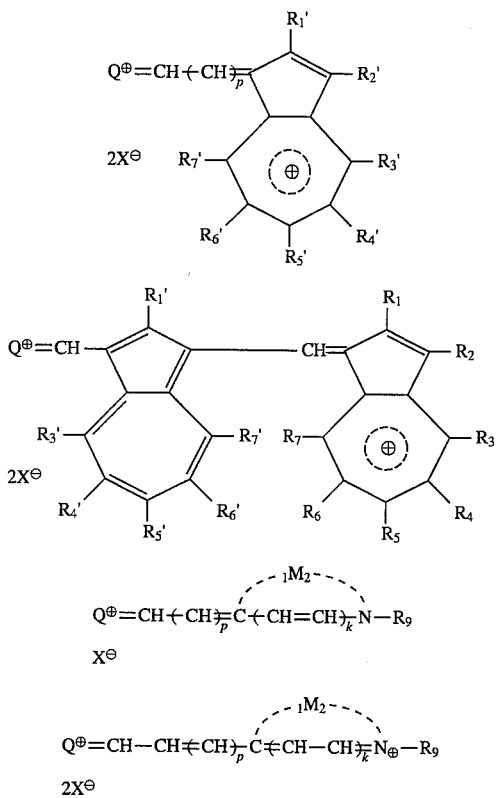

In the formula, $R_{11}$ represents a heterocylic group or a cationic group thereof.

$$Q^{\oplus}=CH+CH\mathbin{\mathchoice{}{}{}{}}_p C-R_{10} \quad (10)$$
$$\phantom{Q^{\oplus}=CH+CH\mathbin{\mathchoice{}{}{}{}}_p C}R_{12}$$
$$qX^{\ominus}$$

In the formula, $R_{12}$ represents a hydrogen atom, an alkyl group or substituted or unsubstituted aryl group.

$$Q^{\oplus}=(CH)_{\overline{p}}-C\equiv C-R_{10} \quad (11)$$
$$X^{\ominus}$$

$$Q^{\oplus}=CH+CH\mathbin{\mathchoice{}{}{}{}}_{\!p}\!\overset{\overset{\displaystyle Z_2}{\frown}}{C}+C=C\mathbin{\mathchoice{}{}{}{}}_{\!k}\!L \quad (12)$$
$$\phantom{Q^{\oplus}=CH+CH\mathbin{\mathchoice{}{}{}{}}_{p}C} R_{13}\ R_{14}$$
$$qX^{\ominus}$$

In the formulas, $Z_2$ represents a group of atoms necessary for completing pyran, thiapyran, selenapyran, telluropyran, benzopyran, benzothiapyran, benzoselenapyran, benzotelluropyran, naphthopyran, naphthothiapyran or naphthoselenapuran or naphthotelluropyran that may be substituted.

L represents a sulfur atom, an oxygen atom, a selenium atom or a tellurium atom.

$R_{13}$ and $R_{14}$ each represent a hydrogen atom, an alkoxyl group, a substituted or unsubstituted aryl group, an aralkenyl group or a heterocyclic group:

Desirable coloring matters include the dyes represented respectively by Formulas (VIII), (IX), (X) and (XI).

$$\overset{\overset{\displaystyle Z_1}{\frown}}{L_1}=(C-C)_s-\overset{}{C}-(C=C)_n-C=\overset{\overset{\displaystyle Z_2}{\frown}}{C}-(C=C)_k-L_2 \quad \text{Formula (VIII)}$$
$$\phantom{L_1}\oplus \quad r_1'\ r_2' \qquad r_5'\ r_6' \qquad r_7' \qquad r_3'\ r_4'$$
$$X^{\ominus}$$

$$\phantom{xxxxxxxxxxxxxxxxxxxxxxx}\overset{\displaystyle r_1}{C}$$
$$\overset{\overset{\displaystyle _1M_2}{\frown}}{^+N}=(CH-CH)_s=C-CH=C\overset{\overset{\displaystyle |}{\frown}}{\phantom{C}}C-(CH=CH)_l CH=\overset{\overset{\displaystyle Z_2}{\frown}}{C}-(C=C)_k L_2 \quad \text{Formula (IX)}$$
$$r_1' \qquad\qquad\qquad\qquad\qquad {\cdot Y\cdot} \qquad\qquad\qquad\qquad r_2'\ r_1'$$
$$X^{\ominus}$$

$$\overset{\overset{\displaystyle Z_1}{\frown}}{^\oplus L_1}=(C-C)_s-\overset{}{C}-CH=Z^{\ominus}-CH=\overset{\overset{\displaystyle Z_2}{\frown}}{C}+C=\!=\!C\mathbin{\mathchoice{}{}{}{}}_k L_2 \quad \text{Formula (X)}$$
$$\phantom{xx} r_1'\ r_2' \qquad\qquad\qquad r_3'\ r_4'$$

$$\overset{\overset{\displaystyle Z_1}{\frown}}{_\oplus L_1}=(C-C)_k-\overset{}{C}-(C=C)_n-R_{15} \quad \text{Formula (XI)}$$
$$\phantom{xx} r_1'\ r_2' \qquad r_4'\ r_5'$$
$$X^{\ominus}$$

In the formula, M represents a group of non-metallic atoms necessary for completing a nitrogen containing heterocyclic ring.

$$Q^{\oplus}=(CH)_{\overline{p}}-R_{10}\ qX^{\ominus} \quad (8)$$

In the formula, $R_{10}$ represents a substituted or unsubstituted aryl group or a cationic group thereof. P represents an integer of 1 to 8. q is 1 or 2.

$$Q^{\oplus}=(CH)_{\overline{p}}-R_{11}\ qX^{\ominus} \quad (9)$$

In the above Formulas (VIII), (IX), (X) and (XI), $L_1$ and $L_2$ each represent a substituted nitrogen atom, sulfur atom, oxygen atom, selenium atom or tellurium atom; $Z_1$ represents a group of atoms necessary for completing pyrilium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium that may be substituted; $Z_2$ represents a group of atoms necessary for completing pyran, thipyran, selenapyran, telluropyran, benzopyran, benzothiopyran, benzoselenapyran, benzotelluropyran, naphthopyran, naphthothiopyran, naphthoselenapyran or naphthotelluropyran that may be substituted. Symbol s is 0 or 1. $R_{15}$ represents a substituted or unsubstituted aryl group or a substituted or unsubstituted heterocyclic group. (Symbols $r_3'$ to $r_7'$ are as defined for $r_1'$ and $r_2'$ described above.)

Symbols k, n, M, $r_1'$, $r_2'$, $r_1$, Y, $Z^\ominus$ and $X^\ominus$ are as defined above.

Symbols in the above formulas will be defined below in greater detail.

A, B, D and E represents a hydrogen atom or an alkyl group (for example, a methyl group, an ethyl group, an n-propyl group, an iso-propyl group, an n-butyl group, a sec-butyl group, an iso-butyl group, a t-butyl group, an n-amyl group, a t-amyl group, an n-hexyl group, an n-octyl group, t-octyl group, etc.) including other alkyl groups, for example, substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, an N-(methylsulfonyl)carbamylmethyl group, a 3-(acetylsulfamyl)propyl group, a 4-(acetylsulfamyl)butyl group, etc.), cyclic alkyl groups (for example, a cyclohexyl group), an allyl group ($CH_2=CH-CH_2-$), alkenyl groups (for example, a vinyl group, a propenyl group, a butenyl group, a pentenyl group, a hexenyl group, a heptenyl group, an octenyl group, a dodecynyl group, a pulenyl group, etc.), aralkyl groups (for example, a benzyl group, a phenyl groups, an α-naphthylmethyl group, a β-naphthylmethyl group, etc.), substituted aralkyl groups (for example, a carboxybenzyl group, a sulfobenzyl group, a hydroxybenzyl group, etc.), etc.

Symbols $r_1'$, $r_2'$, $r_3'$, $r_4'$, $r_5'$, $r_6'$ and $r_7'$ each represents a hydrogen atom or an alkyl group (for example, a methyl group, an ethyl group, an n-propyl group, an iso-propyl group, an n-butyl group, a sec-butyl group, an iso-butyl group, a t-butyl group, an n-amyl group, a t-amyl group, an n-hexyl group, an n-octyl group, t-octyl grou, etc.), including other alkyl groups, for example, substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, an N-(methylsulfonyl)carbamylmethyl group, a 3-(acetylsulfamyl)propyl group, a 4-(acetylsulfamyl)butyl group, etc.), cyclic alkyl groups (for example, a cyclohexyl group), aralkyl groups (for example, a benzyl group, a phenethyl group, an α-naphthylmethyl group, a β-naphthylmethyl group, etc.), substituted aralkyl groups (for example, a carboxybenzyl group, a sulfobenzyl group, a hydroxybenzyl group, etc.), a substituted or unsubstituted alkenyl groups (for example, a vinyl group, a propenyl group, a butenyl group, a pentenyl group, a hexenyl group, a heptenyl group, an octenyl group, a dodecenyl group, a pulenyl group, etc.), a substituted or unsubstituted aryl group (such as phenyl, α-naphthyl, β-naphthyl, tolyl, xylyl, biphenyl, ethylphenyl, methoxyphenyl, ethoxyphenyl, dimethoxyphenyl, hydroxyphenyl, chloroxyphenyl, dichlorophenyl, bromophenyl, dibromophenyl, nitrophenyl, diethylaminophenyl, dimethylaminophenyl and dibenzylaminophenyl).

Symbols k and s each are 0 or 1, and $\underline{1}$, m, and n each are 1 or 2.

Further, $r_1$, $r_2$, $r_3$, $r_4$ and $r_5$ each represent a hydrogen atom, a halogen atom (such as a fluorine atom, a chlorine atom, a bromine atom and an iodine atom), an alkyl group (such as methyl, ethyl, n-propyl, iso-propyl, n-butyl, t-butyl, n-amyl, n-hexyl, n-octyl, 2-ethylhexyl and t-octyl), an alkoxy group (such as methoxy, ethoxy, propoxy and butoxy) or a substituted or unsubstituted aryl group (such as phenyl, tolyl, xylyl, ethylphenyl, methoxyphenyl, ethoxyphenyl, chlorophenyl, nitrophenyl, dimethylaminophenyl, α-naphthyl and β-naphthyl). Y represents a divalent hydrocarbon group, for example, $-CH_2-CH_2-$, $-(CH_2)_3-$,

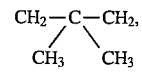

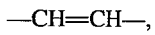

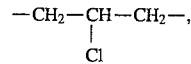

etc., and the 5-membered ring or 6-membered ring, or these may be condensed with a benzene ring, a naphthalene ring or the like.

$R_1$ to $R_7$ and $R_1'$ and $R_7'$ each represent an atom or group including a hydrogen atom and a halogen atom (such as a fluorine atom, a chlorine atom, a bromine atom and an iodine atom), as well as an alkyl group (such as methyl, ethyl, n-propyl, iso-propyl, n-butyl, t-butyl, n-amyl, n-hexyl, n-octyl, 2-ethylhexyl and t-octyl), an alkoxy group (such as methoxy, ethoxy, propoxy and butoxy), a substituted or unsubstituted aryl group (such as phenyl, naphthyl, tolyl, xylyl, ethylphenyl, methoxyphenyl, dimethoxyphenyl, trimethoxyphenyl, ethoxyphenyl, chlorophenyl, nitrophenyl, dimethylaminophenyl, diethylaminophenyl, dipropylaminophenyl, dibenzylaminophenyl, diphenylaminophenyl, α-naphthyl and β-naphthyl), a substituted or unsubstituted aralkyl group (such as benzyl, 2-phenylethyl, 2-phenyl-1-methylethyl, bromobenzyl, 2-bromophenylethyl, methylbenzyl, methoxybenzyl and nitrobenzyl), an acyl group (such as acetyl, propionyl, butyryl, valeryl, benzoyl, tolyloyl, naphthoyl, phthaloyl and furoyl), a substituted or unsubstituted amino group (such as amino, dimethylamino, diethylamino, dipropylamino, acetylamino and benzoyl amino), a substituted or unsubstituted styryl group (such as styryl, dimethylaminostyryl, diethylaminostyryl, dipropylaminostyryl, methoxystyryl, ethoxystyryl and methylstyryl), a nitro group, a hydroxyl group, a carboxyl group, a cyano group or a substituted or unsubstituted arylazo group (such as phenylazo, α-naphthylazo, β-naphthylazo, dimethylaminophenylazo, chlorophenylazo, nitrophenylazo, methoxyphenylazo and tolylazo), a substituted or unsubstituted heterocyclic group (for example, a pyridyl group, a quinolyl group, a lepidyl group, a methylpyridyl group, a furyl group, a thienyl group, an indolyl group, a pyrol group, a carbazolyl group, an N-ethylcarbazolyl group, etc.) or a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group, a 2,2-di(diethylaminophenyl)vinyl group, a 2,2-di(methoxyphenyl)vinyl group, a 2,2-di(ethoxyphenyl)vinyl group, a 2-(dimethylaminophenyl)-2-methylvinyl group, a 2-(diethylaminophenyl)-2-ethylvinyl group, etc.

$R_1'$ to $R_7'$ may also form a condensed ring as in the case of $R_1$ to $R_7$.

$R_8$ represents a hydrogen atom, a nitro group, a cyano group, an alkyl group (such as methyl, ethyl group, propyl and butyl) or an aryl group (such as phenyl, tolyl and xylyl).

$R_9$ represents an alkyl group (such as methyl, ethyl, propyl and butyl), a substituted alkyl group (2-hydroxyethyl, 2-methoxyethyl, 2-ethoxyethyl, 3-hydroxypropyl, 3-methoxypropyl, 3-ethoxypropyl, 3-chloropropyl, 3-bromopropyl and 3-carboxypropyl), a cyclic alkyl group (such as cyclohexyl and cyclopropyl), an arylaralkyl group (such as benzyl, 2-phenylethyl, 3-phenylpropyl, 4-phenylbutyl, α-naphthylmethyl and β-naphthylmethyl), a substituted aralkyl group (such as methylbenzyl, ethylbenzyl, dimethylbenzyl, trimethylbenzyl, chlorobenzyl and bromobenzyl), an aryl group (such as phenyl, tolyl, xylyl, α-naphthyl and β-naphthyl) or a substituted aryl group (such as chlorophenyl, dichlorophenyl, trichlorophenyl, ethylphenyl, methoxyphenyl, dimethoxyphenyl, aminophenyl, nitrophenyl and hydroxyphenyl).

$R_{10}$ represents a substituted or unsubstituted aryl group (such as phenyl, tolyl, xylyl, biphenyl, α-naphthyl, β-naphthyl, anthranyl, pyrenyl, methoxyphenyl, dimethoxyphenyl, trimethoxyphenyl, ethoxyphenyl, diethoxyphenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl and cyanophenyl).

$R_{11}$ represents a monovalent heterocyclic group derived from a heterocyclic ring such as furan, thiophene, benzofuran, thionaphthene, dibenzofuran, carbazole, phenothiazine, phenoxazine or pyridine.

$R_{12}$ represents a hydrogen atom, an alkyl group (such as methyl, ethyl, propyl and butyl) or a substituted or unsubstituted aryl group (such as phenyl, tolyl, xylyl, biphenyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthralyl and pyrenyl).

$R_{13}$ and $R_{14}$ each represent a hydrogen atom, an alkyl group (such as methyl, ethyl, propyl and butyl), an alkoxy group (such as methoxy, ethoxy, propoxy, ethoxyethyl and methoxyethyl), an aryl group (such as phenyl, tolyl, xylyl, chlorophenyl, biphenyl and methoxyphenyl), a substituted or unsubstituted styryl group (such as styryl, p-methoxystyryl, o-chlorostyryl and p-methoxystyryl), a substituted or unsubstituted 4-phenyl-1,3-butadienyl group (such as 4-phenyl-1,3-butadienyl and 4-(p-methylphenyl)-1,3-butadienyl) or a substituted or unsubstituted heterocyclic ring (such as quinolyl, pyridyl, carbazolyl and furyl).

M represents a group of atoms necessary for completing a nitrogen-containing heterocyclic ring such as pyridine, thiazole, benzothiazole, naphthothiazole, oxazole, benzoxazole, naththoxazole, imidazole, benzimidazole, naphthoimidazole, 2-quinoline, 4-quinoline, isoquinoline or indole, and may be substituted with a halogen atom) (such as a fluorine atom, a chlorine atom, a bromine atom and an iodine atom), an alkyl group (such as methyl, ethyl, propyl and butyl), an aryl group (such as phenyl, tolyl and xylyl) or an aralkyl group (such as benzyl and p-tolylmethyl).

$X^{\ominus}$ is an anion, representing a chlorine ion, a bromide ion, an iodide ion, a perchlorate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostanate ion, a chlorosulfonate ion, a fluorosulfonate ion, a trifluoromethanesulfonate ion, a hexanefluoroantimonate ion, a molybdate ion, a tungstate, a titanate ion, a zirconate ion, or the like.

Examples of these coloring matters are shown in Table 1, but by no means limited to these. When $Z^{\ominus}$ is

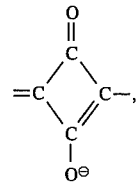

this is indicated as $Za^{\ominus}$, and when $Z^{\ominus}$ is

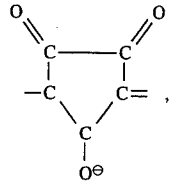

this is indicated as $Zb^{-}$.

TABLE 1

| For. No. | Formula | A | B | D | E | $r_1'$ | $r_2'$ | X | k, l |
|---|---|---|---|---|---|---|---|---|---|
| 1 | (I) | ph | ↓ | ↓ | ↓ | — | — | $BF_4$ | k=0, l=1 |
| 2 | (I) | $(CH_3)_2N$-ph | ph | $(CH_3)_2N$-ph | ph | — | — | $ClO_4$ | k=0, l=1 |
| 3 | (I) | $(CH_3)_2N$-ph | ↓ | $(C_2H_5)_2N$-ph | ↓ | — | — | $BF_4$ | k=0, l=1 |
| 4 | (I) | $(C_2H_5)_2N$-ph | ph | $(C_2H_5)_2N$-ph | ph | H | $CH_3^-$ | $ClO_4$ | k=1, l=0 |
| 5 | (I) | $(C_2H_5)_2N$-ph | ↓ | $(C_2H_5)_2N$-ph | ↓ | — | — | $ClO_4$ | k=0, l=1 |
| 6 | (I) | $(C_2H_5)_2N$-ph | 4-$C_2H_5O$-ph / 2,4-di-$CH_3$-ph | $(C_2H_5)_2N$-ph | 4-$C_2H_5O$-ph / 2,4-di-$CH_3$-ph | — | — | $ClO_4$ | k=0, l=1 |
| 7 | (I) | $(C_2H_5)_2N$-ph | ↓ | $(CH_3)_2N$-ph | ↓ | — | — | $ClO_4$ | k=0, l=1 |
| 8 | (I) | $(C_2H_5)_2N$-ph | ↓ | $(C_2H_5)_2N$-ph-CH=CH— | ↓ | H | $CH_3^-$ | $BF_4$ | k=1, l=0 |
| 9 | (I) | $(C_2H_5)_2N$-ph | H | — | ↓ | — | — | $ClO_4$ | k=0, l=0 |

TABLE 1-continued

| No. | Formula | A | B | D | E | r1 r2 r3 r4 r5 | X | Y | | |
|---|---|---|---|---|---|---|---|---|---|---|
| 10 | (I) | (C₂H₅)₂N–⟨phenyl⟩ | CH₃OC₂H₄–⟨phenyl⟩ | (C₂H₅)₂N–⟨phenyl⟩ | CH₃OC₂H₄–⟨phenyl⟩ | | CH₃ | H | ClO₄ | k = 1, l = 0 |
| 11 | (I) | ⟨pyrrolidinyl-phenyl⟩ | ↓ | (C₂H₅)₂N–⟨phenyl⟩ | ↓ | | — | — | ClO₄ | k = 0, l = 1 |
| 12 | (I) | (C₂H₅)₂N–⟨phenyl⟩ | ⟨naphthyl⟩ | (C₂H₅)₂N–⟨phenyl⟩ | ⟨naphthyl⟩ | | H | –C₂H₅ | BF₄ | k = 1, l = 0 |
| 13 | (I) | (C₂H₅)₂N–⟨naphthyl⟩ | CH₃⁻ | (C₂H₅)₂N–⟨naphthyl⟩ | CH₃⁻ | | — | — | ClO₄ | k = 0, l = 1 |
| 14 | (I) | (C₂H₅)₂N–⟨phenyl⟩ | CH₃⁻ | (C₂H₅)₂N–⟨phenyl⟩ | CH₃⁻ | | — | — | ClO₄ | k = 0, l = 1 |
| 15 | (I) | (CH₃)₂N–⟨phenyl⟩ | CH₃⁻ | (CH₃)₂N–⟨phenyl⟩ | CH₃⁻ | | H | CH₃ | ClO₄ | k = 0, l = 1 |
| 16 | (I) | (CH₃)₂N–⟨phenyl-CH₃⟩ | C₃H₇– | (CH₃)₂N–⟨phenyl-CH₃⟩ | C₃H₇– | | — | — | ClO₄ | k = 1, l = 0 |
| 17 | (I) | (CH₃)₂N–⟨phenyl⟩ | (CH₃)₂N–⟨phenyl⟩ | (CH₃)₂N–⟨phenyl⟩ | (CH₃)₂N–⟨phenyl⟩ | | — | — | ClO₄ | k = 0, l = 1 |
| 18 | (I) | (CH₃)₂N–⟨phenyl⟩ | ⟨furyl⟩ | (CH₃)₂N–⟨phenyl⟩ | ⟨furyl⟩ | | — | — | ClO₄ | k = 0, l = 1 |
| Formula No. | Formula | A | B | D | E | r₁ r₂ r₃ r₄ r₅ | X | Y | | |

TABLE 1-continued

| | | | | | | | | |
|---|---|---|---|---|---|---|---|---|
| 19 | (II) | 4-CH₃O-C₆H₄ | ↓ | ↓ | 4-(CH₃)₂N-C₆H₄ | H | — | Cl | —(CH₂)₃— | m=1, n=0 |
| 20 | (II) | 4-(CH₃)₂N-C₆H₄ | ph | 4-(CH₃)₂N-C₆H₄ | ph | H | — | ClO₄ | —(CH₂)₃— | m=0, n=0 |
| 21 | (II) | 4-(CH₃)₂N-C₆H₄ | ph | 4-(CH₃)₂N-C₆H₄ | ph | H | — | ClO₄ | CH₃-CH₂-C(CH₂CH₃)-CH₃ | m=0, n=0 |
| 22 | (II) | 4-(C₂H₅)₂N-C₆H₄ | ↓ | 4-morpholino-C₆H₄ | ↓ | H | — | ClO₄ | CH₃-CH₂-C(CH₂CH₃)-CH₃ | m=0, n=0 |
| 23 | (II) | 4-(CH₃)₂N-C₆H₄ | ↓ | ↓ | ↓ | H | — | ClO₄ | —(CH₂)₃— | m=0, n=0 |
| 24 | (II) | 4-(C₂H₅)₂N-C₆H₄ | ↓ | ↓ | ↓ | H | — | BF₄ | —CH₂-o-C₆H₄-CH₃ | m=0, n=0 |
| 25 | (II) | 4-pyrrolidino-C₆H₄ | H | 4-pyrrolidino-C₆H₄ | H | Cl | — | ClO₄ | —(CH₂)₂— | m=0, n=0 |
| 26 | (II) | 4-(CH₃)₂N-C₆H₄ | 4-C₂H₅O-C₆H₄ | 4-(CH₃)₂N-C₆H₄ | 4-C₂H₅O-C₆H₄ | H | — | ClO₄ | —(CH₂)₂— | m=0, n=0 |
| 27 | (II) | 4-(CH₃)₂N-C₆H₄ | 4-CH₃-C₆H₄ | 4-(CH₃)₂N-C₆H₄ | 4-CH₃-C₆H₄ | Cl | H | ClO₄ | —(CH₂)₃— | m=1, n=1 |

TABLE 1-continued

| # | Formula | Ar1 | Ar2 | Ar3 | R1 | R2 | R3 | X | Linker | Parameters |
|---|---------|-----|-----|-----|----|----|----|---|--------|------------|
| 28 | (III) | 4-(CH$_3$)$_2$N-C$_6$H$_4$– | ↓ | ↓ | Cl | H | ↓ | — | –(CH$_2$)$_3$– | — |
| 29 | (III) | 4-(CH$_3$)$_2$N-C$_6$H$_4$– | ↓ | ↓ | H | CH$_3$ | CH$_3$ | — | –CH$_2$–C(CH$_3$)$_2$–CH$_2$– | ClO$_4$ |
| 30 | (III) | 4-(CH$_3$)$_2$N-C$_6$H$_4$– | 4-C$_2$H$_5$O-C$_6$H$_4$– (ph) | 4-C$_2$H$_5$O-C$_6$H$_4$– (ph) | Cl | H | ↓ | — | –(CH$_2$)$_3$– | ClO$_4$ |
| 31 | (IV) | 4-(CH$_3$)$_2$N-C$_6$H$_4$– | ↓ | ↓ | H | ↓ | ↓ | — | — | m = 1, n = 1, Z = Za |
| 32 | (IV) | 4-(CH$_3$)$_2$N-C$_6$H$_4$– | ↓ | ↓ | — | — | — | — | — | m = 0, n = 0, Z = Za |
| 33 | (IV) | 4-(CH$_3$)$_2$N-C$_6$H$_4$– | 4-(CH$_3$)$_2$N-C$_6$H$_4$– | 4-C$_2$H$_5$O-C$_6$H$_4$– | H | CH$_3$ | CH$_3$ | ↓ | — | m = 2, n = 0, Z = Zb |
| 34 | (IV) | 4-(CH$_3$)$_2$N-C$_6$H$_4$– | 4-(CH$_3$)$_2$N-C$_6$H$_4$– | 4-CH$_3$-C$_6$H$_4$– | — | — | — | — | — | m = 0, n = 2, Z = Zb |
| 35 | (IV) | 4-(CH$_3$)$_2$N-C$_6$H$_4$– | ↓ | ↓ | H | — | ↓ | ↓ | — | m = 1, n = 1, Z = Zb |
| 36 | (IV) | 4-(C$_2$H$_5$)$_2$N-C$_6$H$_4$– | 4-(CH$_3$)$_2$N-C$_6$H$_4$– | — | — | — | — | — | — | m = 0, n = 1, Z = Za |
| 37 | (IV) | 4-(C$_2$H$_5$)$_2$N-C$_6$H$_4$– | — | ph | — | — | — | — | — | m = 0, n = 0, Z = Zb |

TABLE 1-continued

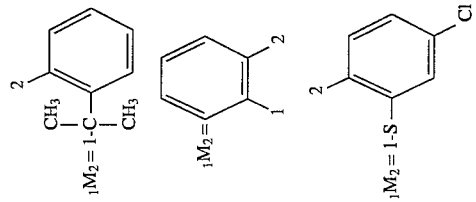

| No. | Formula | F | X | | | m = n = 0 Z = Za |
|---|---|---|---|---|---|---|
| 38 | (IV) | | | ph | ph | — — — |

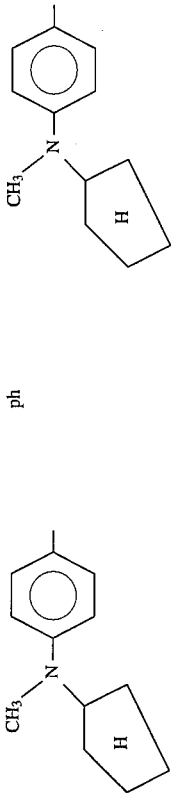

| No. | Formula | F | X | | |
|---|---|---|---|---|---|
| 39 | (V) | (3) | $ClO_4$ | $R_1 = R_3 = R_5 = R_6 = R_1' = R_3' = R_5' = R_6 = H, R_2 = R_2' = R_7 = R_7' = CH_3, R_4 = R_4' = CH(CH_3)_2, R_8 = NO_2, n = 1$ |
| 40 | (V) | (3) | $ClO_4$ | $R_1 = R_3 = R_5 = R_6 = R_1' = R_3' = R_5' = R_6' = H, R_2 = R_2' = R_7 = R_7' = CH_3, R_4 = R_4' = CH(CH_3)_2, R_8 = H, n = 2$ |
| 41 | (V) | (3) | I | $R_1 = R_4 = R_6 = R_1' = R_4' = R_6' = H, R_5 = R_7 = R_5' = R_7' = CH_3, R_2, R_3$ and $R_2', R_3'$ are cyclized with n = 0 $-(CH_2)-$ |
| 42 | (V) | (3) | $ClO_4$ | $R_1 = R_2 = R_3 = R_4 = R_5 = R_6 R_7 = R_1' = R_2' = R_3' = R_4' = R_5' = R_6' = R_7' = H, n = 2$ |
| 43 | (V) | (4) | $ClO_4$ | $R_1 = R_3 = R_5 = R_6 = R_1' = R_2' = R_3' = R_4' = R_6' = R_7' = H, R_3, R_4 = CH(CH_3)_2, R_5' = C(CH_3), n = 2$ |
| 44 | (V) | (4) | $ClO_4$ | $R_1 = R_3 = R_4 = R_6 = H, R_3 = R_5 = R_7 = CH_3, R_4 = CH(CH_3)_2, p = 1$ |
| 45 | (VIII) | (4) | I | $R_1 = R_2 = R_4 = R_6 = H, R_3 = R_5 = R_7 = CH_3, p = 1$ |
| 46 | (VII) | (4) | $ClO_4$ | $R_1 = R_4 = R_6 = H, R_3 = R_5 = R_7 = CH_3, R_2 = NO_2, p = 3$ |
| 47 | (VI) | (1) | — | $R_1 = R_3 = R_5 = R_6 = H, R_2 = R_7 = CH_3, R_4 = CH(CH_3)_2$ |
| 48 | (VI) | (1) | — | $R_1 = R_3 = R_5 = R_6 = H, R_2 = R_7 = CH_3, R_3, R_4$ are combined to form $-S-CH=C(CH_3)_3-$ |
| 49 | (VI) | (1) | — | $R_1 = R_3 = R_4 = R_6 = H, R_2 = R_7 = CH_3, R_5 = ph$ |
| 50 | (VI) | (2) | — | $R_1 = R_2 = R_3 = R_4 = R_6 = H, R_2 = R_7 = CH_3, R_4 = CH(CH_3)_2$ |
| 51 | (VI) | (2) | — | $R_1 = R_3 = R_5 = R_6 = H, R_2 = R_7 = CH_3, R_5 = OC_2H_5$ |
| 52 | (VI) | (2) | $ClO_4$ | $R_1 = R_2 = R_3 = R_4 = R_6 = R_1' = R_3' = R_5 = R_6' = R_7' = H, R_6 = n-C_8H_{17}$ |
| 53 | (VII) | (5) | $ClO_4$ | $R_1 = R_2 = R_3 = R_4 = R_5 = R_6 = R_7 = R_1' = R_3' = R_5' = R_6' = R_7' = H, R_6 = n-C_8H_{17}$ |
| 54 | (V) | (6) | $ClO_4$ | $R_1 = R_3 = R_5 = R_6 = H, R_2 = R_7 = CH_3, R_4 = CH(CH_3)_2, R_9 = C_2H_5$ k = 0, p = 5 |
| 55 | (V) | (6) | $ClO_4$ | $R_1 = R_3 = R_5 = R_6 = H, R_2 = R_7 = R_9 = CH_3, R_4 = CH(CH_3)_2$ k = 1, p = 3 |
| 56 | (VII) | (7) | $BF_4$ | $R_1 = R_3 = R_5 = R_6 = H, R_2 = R_7 = CH_3, R_4 = CH(CH_3)_2, R_9 = C_2H_5$ k = 0, p = 5 |

TABLE 1-continued

| No. | Formula | (n) | Anion | Substituents | Groups |
|---|---|---|---|---|---|
| 57 | (VII) | (7) | ClO$_4$ | R$_1$=R$_3$=R$_5$=R$_6$=H, R$_2$=R$_7$=CH$_3$, R$_4$=CH(CH$_3$)$_2$ k=0, p=5 | $_1$M$_2$=1-S-[2-naphthyl] |
| 58 | (V) | (8) | ClO$_4$ | R$_1$=R$_2$=R$_4$=R$_6$=H, R$_3$=R$_7$=CH$_3$, R$_2$=OC$_2$H$_5$ p=5, q=1 | R$_{10}$=p-C$_6$H$_4$-N(C$_2$H$_5$)$_2$ |
| 59 | (VII) | (8) | ClO$_4$ | R$_1$=R$_3$=R$_5$=R$_6$=H, R$_2$=R$_7$=CH$_3$, R$_4$=CH(CH$_3$)$_2$ p=6, q=2 | R$_{10}$=4-(=N$^\oplus$(CH$_3$)$_2$)cyclohexa-2,5-dien-1-ylidene |
| 60 | (V) | (9) | ClO$_4$ | R$_1$=R$_3$=R$_5$=R$_6$=H, R$_2$=R$_7$=CH$_3$, R$_4$=CH(CH$_3$)$_2$ p=5, q=1 | R$_{11}$=N-methylindolin-2-ylidene |
| 61 | (VII) | (9) | ClO$_4$ | R$_1$=R$_3$=R$_4$=R$_6$=R$_7$=H, R$_5$=n-C$_8$H$_{17}$ p=4, q=2 | R$_{11}$=N-(2-methoxyethyl)quinolinium-2-ylidene |
| 62 | (V) | (9) | BF$_4$ | R$_1$=R$_3$=R$_6$=H, R$_2$=R$_7$=CH$_3$, R$_4$ and R$_5$ are combined to form —S—CH=C(CH$_3$)— p=5, q=1 | R$_{11}$=benzothiazol-2-ylidene |
| 63 | (V) | (10) | ClO$_4$ | R$_1$=R$_3$=R$_5$=R$_6$=H, R$_2$=R$_7$=CH$_3$, R$_4$=CH(CH$_3$)$_2$ p=4, q=1 | R$_{10}$=R$_{12}$=p-C$_6$H$_4$-N(C$_2$H$_5$)$_2$ |
| 64 | (VII) | (10) | ClO$_4$ | R$_1$=R$_3$=R$_5$=R$_6$=H, R$_2$=R$_7$=CH$_3$, R$_4$=CH(CH$_3$)$_2$ p=3, q=2 | R$_{10}$=p-C$_6$H$_4$-N(C$_2$H$_5$)$_2$, R$_{12}$=4-(=N$^\oplus$(C$_2$H$_5$)$_2$)cyclohexa-2,5-dien-1-ylidene |

TABLE 1-continued

| 65 | (V) | (11) | ClO₄ | R₁=R₃=R₅=R₆=H, R₂=R₇=CH₃, R₄=CH(CH₃)₂ p=3 | R₁₀= 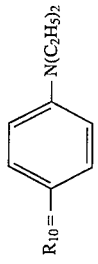N(C₂H₅)₂ |
| --- | --- | --- | --- | --- | --- |
| 66 | (V) | (12) | ClO₄ | R₁=R₃=R₅=R₆=H, R₂=R₇=CH₃, R₄=CH(CH₃)₂ p=3, q=1, k=0, L=S | Z₁₂= —CH=C—CH=C— with ph, ph |
| 67 | (V) | (12) | ClO₄ | R₁=R₂=R₄=R₆=R₁₃=H, R₃=R₅=R₇=CH₃, R₁₄=ph p=3, q=1, k=1, L=Te | Z₁₂= —CH=C— with ph |
| 68 | (VII) | (12) | ClO₄ | R₁=R₃=R₅=R₆=R₁₃=H, R₂=R₇=CH₃, R₄=CH(CH₃)₂, R₁₄=ph p=2, q=2, k=1, L=Te⊕ | Z₁₂= —CH=C— with ph |
| 69 | (V) | (12) | BF₄ | R₁=R₃=R₅=R₆=H, R₂=R₇=CH₃, R₄=CH(CH₃)₂ p=3, q=1, k=0, L=0 | Z₁₂= 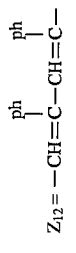 with ph, —C=C— |

| For-No. | mula | X | Z₁ | Z₂ | ₁M₂ | |
| --- | --- | --- | --- | --- | --- | --- |
| 70 | (VIII) | ClO₄ |  —C=CH— with ph | 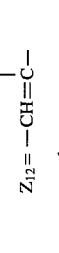 —CH=C— with ph | — | L₁=L₂=S, n=k=S=l, r₁'=r₄'=ph, r₂'=r₃'=r₅'=r₆'=r₇'=H |
| 71 | (VIII) | ClO₄ | 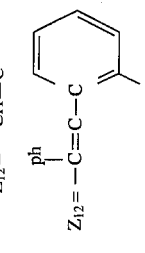 —C=CH— with t-C₄H₉ |  —CH=C— with t-C₄H₉ | — | L₁=Te, L₂=0, n=k=S=l, r₁'=r₄'=t-C₄H₉, r₂'=r₃'=r₅'=r₆'=r₇'=H |
| 72 | (VIII) | ClO₄ |  —C=CH— with ph |  —CH=C— with ph | — | L₁=Te, L₂=S, n=k=S=l, r₁'=r₄'=ph, r₂'=r₃'=r₅'=r₆'=r₇'=H |
| 73 | (IX) | I | — |  —CH=C—CH=C— with ph, ph | 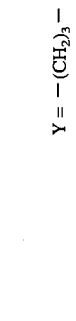 | L₂=0, r₁=H, r₁'=C₂H₅, k=S=l=0 Y= —CH₂—C(CH₃)₂—CH₂— with CH₃, CH₃ |
| 74 | (IX) | ClO₄ | — |  —CH=C— with ph | —CH=CH— | L₂=Te, r₁'=C₂H₅, r₁=Cl, r₂'=H, r₁'=ph k=l, l=S=0 Y= —(CH₂)₃— |

TABLE 1-continued

| | | | | | | |
|---|---|---|---|---|---|---|
| 75 | (IX) | ClO$_4$ | — | [o-methylphenyl-S-] | [o-methylphenyl-S-CH$_3$] | L$_2$=NC$_2$H$_5$, r$_1$'=C$_2$H$_5$, r$_1$=Cl, k=S=0, l=1 | r=—(CH$_2$)$_3$— |
| 76 | (X) | — | —C(t-C$_4$H$_9$)=CH— | —CH=C(t-C$_4$H$_9$)— | — | L$_1$=L$_2$=S, r$_1$'=r$_4$'=t-C$_4$H$_9$, Z=Za S=k=1, r$_2$'=r$_3$'=H | |
| 77 | (X) | — | —C(ph)=CH— | —CH=C(ph)— | — | L$_1$=L$_2$=S, r$_1$'=r$_4$'=ph, r$_2$'=r$_3$'=H, Z=Zb S=k=1 | |
| 78 | (XI) | ClO$_4$ | —C(ph)=CH— | — | — | L$_1$=Te, r$_1$'=ph, r$_2$'=r$_4$'=r$_5$'=H n=2, k=1 | R$_{15}$= [4-(N(C$_2$H$_4$OCH$_3$)$_2$)phenyl] |
| 79 | (XI) | ClO$_4$ | —C(ph)=CH—C(ph)=CH— | — | — | L$_1$=S, r$_4$'=r$_5$'=H n=2, k=0 | R$_{15}$= [4-(N(CH$_3$)$_2$)phenyl] |
| 80 | (XI) | ClO$_4$ | —C(ph)=CH— | — | — | L$_1$=S, r$_1$'=ph, r$_2$'=r$_4$'=r$_5$'=H n=2, k=1 | R$_{15}$= [2-(indole with ph at C-ph position)] |

Further, the recording layer 3 can contain a stabilizer, such as an infrared absorber, for improving the light fastness and/or a binder not changing the spectral characteristic of the recording layer composed by an organic coloring matter alone so as to improve the film-forming characteristic. The recording layer 3 may preferably have a thickness providing as high a reflectance as possible, more specifically of at least 8%, further preferably at least 10%, and most preferably a thickness providing a maximum reflectance, for a reproducing light beam, so as to allow an accurate reproduction of a pre-format pattern formed on the substrate.

The separating layer 4 may preferably be a layer which is melted and/or deformed to allow a contact between the recording layer and the supplementary record layer on heating by photo-irradiation and, at the time of non-recording, prevents an interaction between the recording layer and the supplementary record layer. The separating layer 4 may preferably be one not causing a mutual diffusion with the recording layer or not changing the spectral characteristic of the recording layer, even if it causes a diffusion, when it is in contact with the recording layer.

More specifically, the separating layer may comprise, for example, a polymer, such as polyethylene, polypropylene, ethylene-vinyl acetate copolymer, cellulose acetate, polycarbonate or polystyrene; or an inorganic material, such as $SiO_2$, $SiO$, $CS_2$ or $Si_3N_4$. The separating layer 4 may preferably have a thickness of 20–200 nm, particularly 30–100 nm, so as to melted, deformed or follow a deformation of the recording layer on heating of the recording layer by irradiation with laser light to provide a hole allowing contact between the recording layer and the supplementary record layer. The separating layer 4 shown in FIG. 1B provides an improved durability than in the case where the recording layer and the supplementary record layer directly contacts each other as shown in FIG. 1A. The provision of such a separating layer also results in a substantial decrease in recording sensitivity to provide a recording medium which is free from an optical change even under irradiation with a higher-intensity reproducing light beam, thus allowing a reproduction at a higher contrast.

It is also possible to form the separating layer 4 with a polymer containing a material, such as an organic coloring matter, which absorbs a recording light beam to generate heat, so as to suppress the decrease in recording sensitivity caused by the provision of the separating layer to provide an optical recording medium which has a good recording sensitivity and yet allows reproduction of recorded information at high contrast. In this case, the separating layer may preferably contain 1 to 5 wt. %, particularly 1–3 wt. %, of the coloring matter so as not to cause a diffusion leading to a change in spectral characteristic under contact with the supplementary record layer.

In the present invention, the substrate 2 may for example comprise a glass plate, a transparent ceramic plate, or a transparent plastic plate of, e.g., polyvinyl chloride, polymethyl methacrylate, polycarbonate, polysulfone or a polyolefine resin. Particularly, a polymethyl methacrylate plate is preferred because it is accompanied with little optical birefringence, hard and excellent in mar resistance. The substrate may preferably comprise a transparent material. The substrate can be provided with grooves or pre-pits for tracking on its surface.

Further, the protective sheet 7 may comprise polymethyl methacrylate, polycarbonate, polysulfone, polyvinyl chloride, etc., and may particularly preferably comprise polycarbonate when it is thin because of its good flexural fatigue resistance, adhesiveness to printing ink and inexpensiveness.

The optical recording medium according to the present invention may for example be formed as follows.

A substrate 2 is coated with a prescribed thickener of recording layer 3 by a known application method, such as dip coating, spray coating, spinner coating, bar coating, roller coating or curtain flow coating, or by a vapor deposition method, such as vacuum evaporation or sputtering.

Then, the recording layer 3 is coated with an optical separating layer 4 in a prescribed thickness as by application, vapor deposition or film application and then with a prescribed thickness of a supplementary record layer 5 of the above-mentioned polymer as by liquid application or film application, followed by application of a protective sheet 7 with an adhesive layer 6. Further, when the supplementary record layer 5 is formed as a film in advance, the optional separating layer 4 and the recording layer 3 are successively formed thereon to form a laminate film (8), which may be then applied to the substrate 2 or the protective sheet 7 by an adhesive layer as shown in FIG. 1B (or 1A).

The adhesive layer 6 may preferably comprise an adhesive which is curable or shows an adhesiveness at room temperature or a relatively low temperature, such as a silicone-type room temperature-curable adhesive, an epoxy-type room temperature-curable adhesive or a hot melt-type adhesive.

The overall shape of the optical recording medium 1 may be as desired but may preferably be a card or a disk, particularly a card of the adhesived structure.

Figure 3:
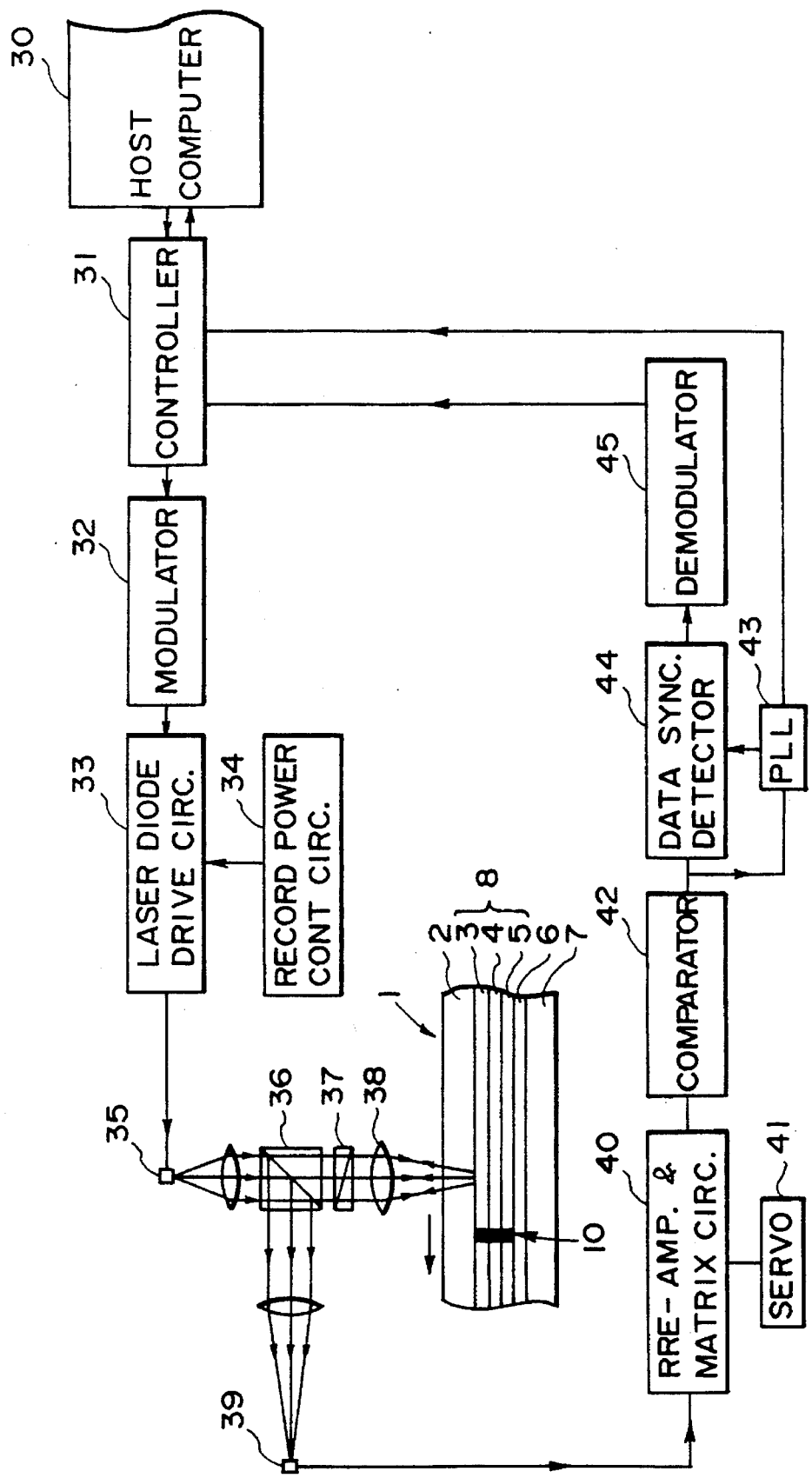
FIG. 3 is an illustration showing an outline of a recording and reproducing system using an optical recording medium of the present invention.

Then, methods of information recording and reproduction by using the optical recording medium (record blank) according to the present invention will now be explained with reference to FIG. 3.

Information recording is first explained. Referring to FIG. 3, an information recording and reproducing system as shown includes a record blank 1 (similar to the one shown in FIG. 1B) which is moved by a driving means (not shown). Recording data sent from a host computer 30 is subjected to parallel-to-serial data conversion, addition of error correction code, etc. by a controller 31 for controlling the apparatus for recording and reproducing data in and from the medium 1, and then the serial data is converted into code signals by a modulating circuit 32. The coded signal data is sent through a laser diode drive circuit 33 connected to a recording power control circuit 34 to a laser diode 35, which issues a recording light beam having varying strengths changing between a high level and a low level depending on the modulated data. The recording light beam passing a polarizing beam splitter 36 is converted into circular polarized light when it passes through a quarter wave plate 37. The circular polarized light is focused by a condenser lens 38 into a spot beam with a diameter of about 1 μm, which is then incident on the recording medium 1 from the side of the substrate 2 to irradiate the recording layer 3. As a result, when the recording light beam has an intensity at its high level, the separating layer 4 is locally broken by the heat generated in the recording layer 3 to form a co-melted mixture 10 of the recording layer 3 and the supplementary record layer 5 to be fixed. At the low level of the recording light beam, the separating layer 4 retains its integrity. As a result, the co-melted mixture part 10 forms a record pit showing a spectral characteristic having changed from that of the original recording layer 3. The medium 1 having a plurality of such record pits provides an information record.

Next, the information reproduction operation is explained.

In the reproduction mode, the output power level of the laser diode 35 is fixed by the control circuit 32–34 to a constant level below that required for breakage of the separating layer 4. The reproducing laser beam at a constant level is passed through the polarizing beam splitter 36, the quarter wave plate 37 and the condenser lens 38 to be focused onto the recording layer 3 surface of the information record 1. Then, the light reflected from the recording layer surface is again passed through the quarter wave plate 37 after which the reflected light is caused to have a polarized light plane which is different by 90 degrees from the incident light and is reflected by the beam splitter 36 to reach an optical detector 39. The intensity of the light entering the detector 39 is changed when the focused beam passes over the record pit 10 in the recording layer 3.

The output from the optical detector 39 is amplified and transformed into a reproduced signal, a focus servo signal and a tracking servo signal by a pre-amplifier and matrix circuit 40. The focus servo signal and tracking servo signal are sent to a servo control system 41. The reproduced signal outputted from the matrix circuit 40 is converted into a digital signal by a comparator 42 and sent to a phase locked loop (PLL) circuit 43 at which a clock signal is extracted. The clock signal is used for synchronizing demodulation of the reproduced signal at a data synchronizing and detection system 44. Then, the signal from the detection system 44 is demodulated by a demodulator circuit 45 according to an algorithm reverse to that for the modulation into data of the original type, which is then sent to the controller 31 to be read by the host computer 30.

The laser diode 35, beam splitter 36, quarter wave plate 37, condenser lens 38 and optical detector 39 in combination form an optical head, which is driven to an objective track for recording and reproduction based on the data from the controller 31, and the movement of the optical head and the medium 1 is controlled by the servo control system 41 based on signals including the focus servo signal and tracking servo signal sent from the matrix circuit 40.

During reproduction, it is possible to increase the contrast between a record part and a non-record part if the wavelength of the reproducing light beam is set to the same as or close to a wavelength giving a maximum reflectance from the non-record part of the recording layer 3.

Further, it is possible to use different wavelengths for the recording light and the reproducing light beam. For example, when the recording light beam has a wavelength $\lambda_1$ and the reproducing light beam has a wavelength $\lambda_2$, the intensity of the reproducing light beam can be increased to provide an improved record contrast if an optical coloring matter having a maximum reflectance wavelength in the vicinity of $\lambda_2$ is contained in the recording layer 3 and an optical coloring matter having a maximum absorption wavelength in the vicinity of $\lambda_1$ is contained in the separating layer 4. In this instance, it is preferred to satisfy the relationship of $\lambda_2 \leq \lambda_1$ so as to completely suppress the breakage of the separating layer 4 by the reproducing light beam.

As described above, in the embodiment shown in FIG. 1B of the optical recording medium according to the present invention wherein a supplementary record layer 5 is laminated onto a recording layer 3 by the medium of a separating layer 4, when the medium is irradiated with a relatively weak recording laser beam (e.g., spot diameter: 3 μm, laser power: 3 mW; irradiation time: 10–50 μsec) through a substrate 2, a part of the organic coloring matter in the recording layer is decomposed and also the separating layer between the recording layer and the supplementary record layer is locally melted to form a hole, through which the coloring matter is melted and diffused into the supplementary record layer and/or the supplementary record layer is melted and diffused into the recording layer to form a co-melted mixture of the recording layer and the supplementary record layer at the boundary between the recording layer and the supplementary record layer. As a result, due to the interaction between the polar group (e.g., amide group, ether group or carbonyl group) and the coloring matter molecule, the molecular arrangement or spectral absorption characteristic of the coloring matter is changed to provide a record showing a change in reflectance at a part irradiated with the recording laser light of the recording layer.

In the present invention, where the interaction between the organic coloring matter and the supplementary record layer is utilized for recording, it is possible to form a high-quality record pit even in an adhesived recording medium unlike the conventional formation of record pits due to thermal decomposition and thermal deformation of a coloring matter. Further, unlike a known mode of recording wherein an organic coloring matter is reacted with another substance to destroy the molecular structure of the coloring matter, thus causing an optical change, the spectral characteristic change in the co-melted mixture of the recording layer and the supplementary record layer without accompanying a molecular structure change of the coloring matter is utilized for recording in the present invention, and the co-melted mixture state is thermally stable, so that an information record having an excellent durability free from a record contrast change during storage can be obtained.

Further, according to the optical recording medium of the present invention, a small decrease in reflectance at a record pit formed by a small degree of thermal deformation and/or thermal decomposition in an adhesive structure of optical recording medium is supplemented by an interaction between the optical coloring matter and the supplementary record layer to cause a large decrease in reflectance of the coloring matter providing a sufficient record contrast.

In other words, in the optical recording medium according to the present invention, a reflectance change caused by co-melting mixture of the colorant and the supplementary record layer is added to a known reflectance change due to thermal deformation and thermal decomposition of an optical coloring matter, whereby a sufficient record contrast can be attained at a low recording energy.

Further, in a preferred embodiment of the organic recording medium of the present invention, a separating layer is inserted between the recording layer and the supplementary record layer, the substance constituting the supplementary record layer liberated from the supplementary record layer is prevented from contacting the optical coloring matter constituting the recording layer even at a high temperature, so that an improved environmental durability is attained.

In this embodiment, it is also possible to control the recording sensitivity of the optical recording medium by controlling the sensitivity of the separating layer to the recording light beam, so that it is possible to obtain a wide range of optical recording media including one with a high sensitivity and one with an excellent environmental stability and little degradation by the reproducing light beam depending on the intended use of the optical recording medium.

Figure 5:
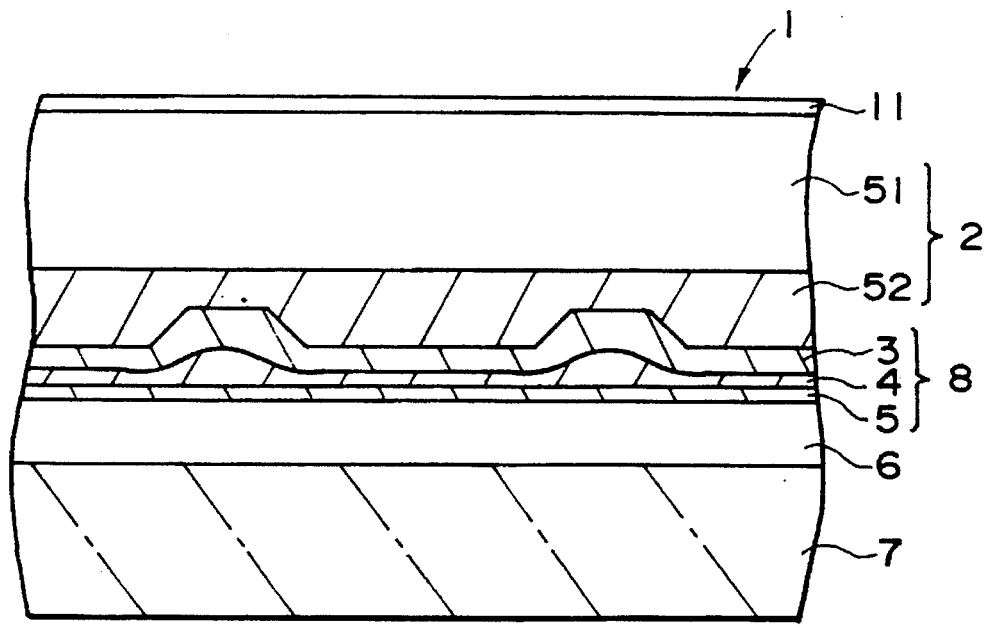
FIG. 5 is a schematic sectional view showing another embodiment of the record blank according to the present invention.

A further advantage of the present invention is attained in an optical recording medium produced according to the so-called 2P process as shown in FIG. 5, wherein a flat substrate 51 coated with a photocurable resin layer 52, in which an unevenness pattern including a tracking groove is formed to provide a substrate 2. More specifically, such a substrate for an optical recording medium produced by the 2P process is accompanied with a problem that the deformation of a recording layer formed thereon is strongly suppressed to remarkably lower the recording sensitivity while it has an advantage of excellent solvent resistance. However, according to the present invention, it is possible to obtain a high-sensitivity optical recording medium from such a substrate obtained by the 2P process.

Hereinbelow, the present invention will be described based on Examples.

EXAMPLE 1

A 0.4 mm-thick substrate of polymethyl methacrylate with a planar size of 85 mm×54 mm having 3 micron-wide tracking grooves at a pitch of 12 microns on its one face for an optical card was prepared by casting.

Figure 6:
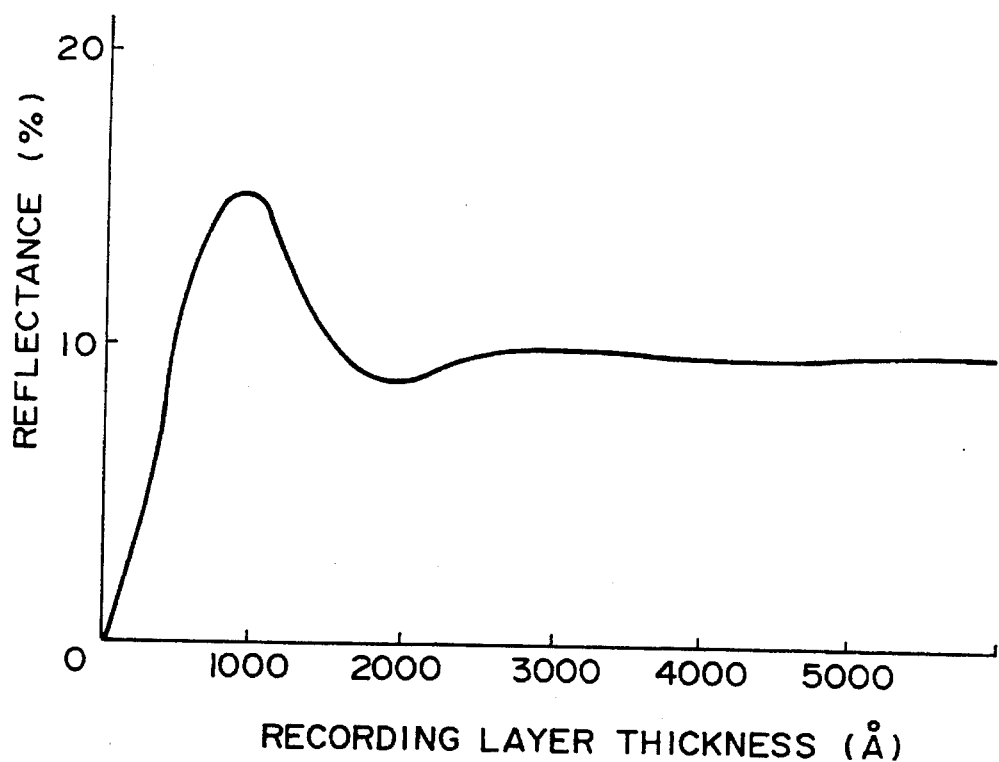
FIG. 6 is a graph showing a change in reflectance of light with a wavelength of 830 nm by the film of the optical coloring matter used in Example 1 as a function of the film thickness.

Then, the face of the optical card substrate provided with tracking grooves was coated by a 1000 Å-thick layer of polymethine dye of the structural formula shown below (Coloring Matter No. 5 in Table 1 above) as a recording layer by using a gravure coater. The thickness of 1000 Å provides a maximum reflectance to light with a wavelength of 830 nm (see FIG. 6).

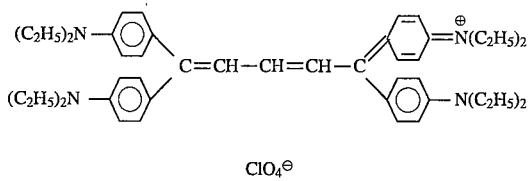

Then, the recording layer was laminated with a 30 micron-thick film of a polyester-type polymer (trade name "KEMIT 248", mfd. by Toray K.K.) in mixture with 10 wt. % of phthalic anhydride, as a supplementary record layer, and then laminated with a 0.3 mm-thick polycarbonate protective sheet by using a silicone-type adhesive ("TSE 3033", mfd. by Shin-Etsu Silicone K.K.) to prepare an optical card.

The optical card was loaded on an optical card recording and reproducing apparatus (mfd. by Canon) and then irradiated from its substrate side with a semiconductor laser beam of 830 nm for recording at a laser power of 3 mW, a pulse duration (irradiating time) of 20 μsec and a spot diameter of 3 microns.

Then, the resultant record was reproduced by irradiation with a reproducing semiconductor laser beam with a wavelength of 830 nm and a reproducing laser power of 0.2 mW, whereby the non-record part showed a reflectance of 16% and the record part showed a reflectance of 3%, thus providing a good contrast $(1-R_2/R_1)$ of 0.6, wherein $R_1$ was an RF (radio frequency) output level from the non-record part and $R_2$ was an RF output level from the record part.

In the above test, the optical card was moved at rates of 120 mm/sec for the recording and 480 mm/sec for the reproduction.

Figure 4:
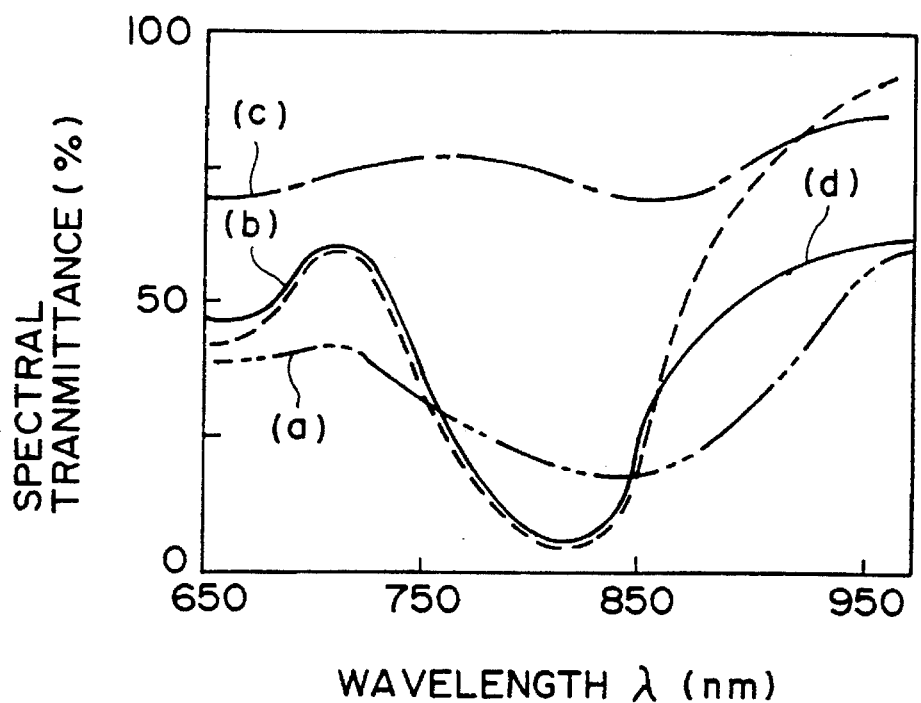
FIG. 4 is a graph showing spectral transmittances of a non-record part of an optical recording medium, a conventionally formed record part and a record part according to the present invention.

Then, the spectral transmittances at the non-record part and the record part (pit) formed by the laser beam irradiation of the recording layer were measured by an instantaneous multiple photometry system (trade name: "MPCD Model 1000", mfd. by Ohtsuka Denshi K.K.). The results are shown in FIG. 4, wherein the curve (a) represents the spectral transmittance at the non-record part of the recording layer and the curve (b) represents that at the record pit.

Separately, after recording, the optical card was subjected to a durability test by standing the card in an environment of a temperature of 50° C. and a relative humidity of 90% for 1000 hours, whereby the change in contrast measured after the durability test was within 10% of the original value.

Comparative Example 1

An optical card substrate identical to the one used in Example 1 was first coated with a 1000 Å-thick layer of the same polymethine dye as used in Example 1 and then coated with a dispersion of 9 wt. parts of benzoyl peroxide as a photo-radical-generating compound together with 1 wt. part of nitrocellulose in a mixture liquid of 1 wt. part of dichloroethane and 2 wt. parts of diacetone alcohol by means of a gravure coater to form a benzoyl peroxide-containing layer in a dry thickness of 750 Å, which was then laminated with a protective sheet similarly as in Example 1 to obtain an optical card.

The optical card was subjected to recording and reproduction in the same manner as in Example 1, whereby the pit showed a reflectance of 8% and a contrast of 0.5. The spectral transmittance at the pit was measured in the same manner as in Example 1. The results are represented by a curve (c) in FIG. 4.

The optical card was subjected to a similar durability test as in Example 1 in an environment of a temperature of 50° C. and 90% RH, whereby accurate information reproduction became impossible around 1000 hours because the record pit size was enlarged to change the pit spacing from the recorded state.

Observation of the curve (b) (record pit) in comparison with the curve (a) (non-record part) in FIG. 4 shows that the spectral transmittance (accordingly also spectral absorption) of the optical coloring matter in the recording layer was shifted in the neighborhood of the wavelength λ(=830 nm) of the recording laser light, whereby the reflectance for the reproducing light of 830 nm was decreased from 16% to 3%. The above observed change in spectral transmittance characteristic represented by the curve (b) from (a) in Example 1 is utterly different from the change in optical spectral transmittance represented by the curve (c) from (a) in Comparative Example 1, the phenomenon caused in the recording medium of Example 1 is believed to be essentially different from thermal decomposition or decoloration observed in the known recording medium of Comparative Example 1.

Reference Example 1

A glass substrate was coated with a mixture of the polymethine dye and the material of the supplementary recording layer in a weight ratio of 1:20 dissolved or dispersed in dichlorobenzene by means of a gravure coater to form a recording layer in a dry thickness of 1000 Å. The spectral transmittance characteristic of the recording layer was measured through the glass substrate. The result is represented by the curve (d) in FIG. 4.

Then, the recording layer was subjected to extraction of the optical coloring matter with diacetone alcohol, and the resultant extract liquid was applied onto a glass substrate to form a layer of the coloring matter in a dry thickness of 1000 Å. The spectral transmittance characteristic of the coloring matter layer was measured and the resultant curve was almost in agreement with the curve (a) of the non-record part in the recording layer of Example 1 including its maximum absorption wavelength. From this, the spectral characteristic change caused at the record pit in Example 1 was given without a reaction, such as decomposition, of the optical coloring matter.

Further, in view of the fact that the curve (d) in FIG. 4 obtained by Reference Example 1 is in substantial agreement with the curve (b) obtained at the record pit in Example 1 at least in the neighborhood of the maximum absorption peak wavelength, it is understood that the spectral characteristic change in Example 1 was caused not by decomposition of the optical coloring matter but by mixing of the optical coloring matter and the material constituting the supplementary recording layer.

EXAMPLE 2

A 0.4 mm-thick substrate of polymethyl methacrylate with a planar size of 85 mm×54 mm having 3 micron-wide tracking grooves at a pitch of 12 microns on its one face for an optical card was prepared by casting.

Then, the face of the optical card substrate provided with tracking grooves was coated by a 1000 Å-thick layer of polymethine dye of the structural formula shown below (Coloring Matter No. 5 in Table 1 above) as a recording layer by using a gravure coater.

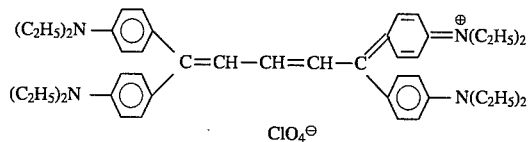

Then, the recording layer was laminated with a 1000 Å-thick vapor-deposited film of polyparaxylylene as a separating layer and then with a 30 micron-thick film of a polyester-type polymer (trade name "KEMIT 248", mfd. by Toray K.K.) in mixture with 10 wt. % of phthalic anhydride, as a supplementary record layer, and further laminated with a 0.3 mm-thick polycarbonate protective sheet by using a silicone-type adhesive ("TSE 3033", mfd. by Shin-Etsu Silicone K.K.) to prepare an optical card.

The optical card was loaded on an optical card recording and reproducing apparatus (mfd. by Canon) and then irradiated from its substrate side with a semiconductor laser beam of 830 nm for recording at a laser power of 3 mW, a pulse duration (irradiating time) of 20 μsec and a spot diameter of 3 microns.

Then, the resultant record was reproduced by irradiation with a reproducing semiconductor laser beam with a wavelength of 830 nm and a reproducing laser power of 0.2 mW, whereby a good contrast $(1-R_2/R_1)$ of 0.6 was obtained.

In the above test, the optical card was moved at rates of 100 mm/sec for the recording and 400 mm/sec for the reproduction.

Separately, after recording the optical card was subjected to a durability test by standing the card in an environment of a temperature of 50° C. and a relative humidity of 90% for 1000 hours, whereby the change in contrast measured after the durability test was within 5% of the original value.

Comparative Example 2

An optical card was prepared in the same manner as in Example 1 except that the supplementary record layer was omitted and an ethylene-vinyl acetate copolymer-type hot melt film ("Hirodine 7580", mfd. by Hirodine K.K.) was used as an adhesive for application of the polycarbonate protective sheet.

The optical card was used for recording and reproduction in the same manner as in Example 1, whereby a contrast of 0.3 was obtained.

The contrast change after the durability test was 20% at the maximum.

EXAMPLE 3

An optical card having the same level of sensitivity as the one of Example 1 was obtained in the same manner as in Example 1 except that a film of a polyester-type polymer ("PH413", mfd. by Nihon Matai K.K.) in mixture with 10 wt. % of maleic anhydride was used as the supplementary record layer.

EXAMPLE 4

An optical card was prepared in the same manner as in Example 2 except that a film of a polyamide-type polymer ("DIAMIDE", mfd. by Daicel K.K.) in mixture with 5 wt. % of phthalic anhydride was used as the supplementary record layer.

The optical card provided a record showing a high contrast of 0.7 when used in recording in the same manner as in Example 2.

EXAMPLE 5

An optical card was prepared in the same manner as in Example 2 except that a film of an epoxy-type polymer ("PE 411", mfd. by Nihon Matai K.K.) in mixture with 5 wt. % of phthalic anhydride was used as the supplementary record layer.

The optical card provided a record showing a high contrast of 0.5 when used in recording in the same manner as in Example 2.

EXAMPLE 6

An optical card having the same level of sensitivity as the one of Example 2 was obtained in the same manner as in Example 2 except that a 500 Å-thick polyethylene film was used as the separating layer.

EXAMPLE 7

An optical card was prepared in the same manner as in Example 2 except that a 500 Å-thick separating layer was formed by applying a liquid formed by dissolving and dispersing polystyrene and 2 wt. % of the polymethine dye (No. 5) used in the recording layer in methyl ethyl ketone at a rate of 1 wt. % on the recording layer by spin coating.

The optical card was subjected to recording and reproduction in the same manner as in Example 2 except that the recording speed was 120 mm/sec and the reproduction speed was 480 mm/sec, whereby a contrast of 0.7 was obtained. The change in contrast after the durability test was within 10%.

EXAMPLE 8

Referring to FIG. 8, a 0.4 mm-thick polycarbonate resin substrate 51 in a planar size of 85 mm×54 mm was coated with a layer 52 of an ultraviolet-curable resin of the following composition in a thickness of 50 microns.

| Ultraviolet-curable resin composition | |
| --- | --- |
| Urethane acrylate | 30 wt. parts |
| Neopentyl glycol-modified trimethylolpropane diacrylate | 67 wt. parts |
| 1-Hydroxycyclohexyl phenyl ketone | 3 wt. parts |

Then, a stamper having a pattern corresponding to tracking grooves for an optical card disposed with a width of 3 microns, a pitch of 12 microns and a depth of 3000 Å was placed in intimate contact with the ultraviolet-curable resin layer, which was then irradiated through the substrate 21 with ultraviolet rays (300 mW/cm$^2$) from a 2 KW-high pressure-mercury lamp to be cured. Then, the stamper was pealed off to leave an optical card substrate 2 (as shown in FIG. 5).

Then, the optical card substrate was laminated with the same recording layer, separating layer, supplementary recording layer and protective sheet in the same manner as in Example 2 to form an optical card.

The optical card was used in recording and reproduction in the same manner as in Example 2, whereby a good contrast of 0.5 was obtained.

Comparative Example 3

An optical card was prepared in the same manner as in Example 8 except that the separating layer and supplementary record layer were omitted.

As a result of recording and reproduction in the same manner as in Example 8, the optical card showed a contrast of 0.1 which was too low for practical use.

EXAMPLE 9

A 30 micron-thick polyester-phthalic anhydride mixture film identical to the one used in Example 1 as the supplementary record layer was coated with a solution comprising 0.05 wt. part of an organic coloring matter of the formula shown below showing a maximum absorption at a wavelength of 860 nm, 1 wt. part of formamide, 1 wt. part of cellulose acetate and 97.8 wt. parts of acetone to form a laminate film having a 1000 Å-thick separating layer on the supplementary record layer.

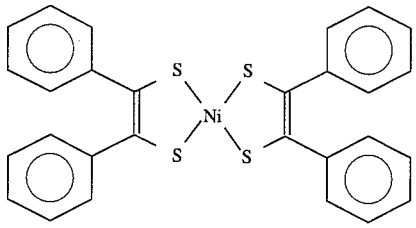

Separately, a substrate identical to the one prepared in Example 8 was coated with a 3% solution in dichloroethane of an organic coloring matter No. 40 in Table 1 above showing a maximum reflectance at 780 nm to form a 600 Å-thick recording layer, which was then laminated with the above-prepared laminate film so that the recording layer contacted the separating layer, and then laminated with a protective sheet by the medium of a rubber-type hot melt adhesive ("MELTLON 3S42" (trade name), mfd. by Diabond Kogyo K.K.) to form an optical card.

The optical card was loaded on an optical card recording and reproducing apparatus and subjected to recording by using a laser beam having a wavelength of 780 nm, a laser power of 3 mW, a pulse duration of 20 μsec and a spot diameter of 3 microns at a card moving speed of 120 mm/sec.

Then, the resultant record was reproduced by using a laser beam having a wavelength of 830 nm and a power of 0.3 mW at a card moving speed of 480 mm/sec, whereby a good contrast of 0.6 was obtained. The contrast caused substantially no change after the durability test.

EXAMPLES 10–13

Optical cards were prepared in the same manner as in Example 8 except that the coloring matter used in the recording layer and the materials constituting the separating layer and the supplementary record layer were those listed in Table 2 below.

The optical cards were used in recording and reproduction in the same manner as in Example 2 to measure the contrast and subjected to the durability test for measurement of the contrast change.

The results are also shown in Table 2.

Comparative Examples 4–7

Optical cards were prepared in the same manner as in Examples 10–13, respectively, except that the supplementary record layer and the separating layer were omitted.

The optical cards were tested in the same manner as in Examples 10–13. The results are also shown in Table 2.

TABLE 2

| | Coloring matter (No. in Table 1) | Separating layer | Supplementary record layer polymer/polar compound | Contrast | Contrast change after durability test |
| --- | --- | --- | --- | --- | --- |
| Example | | | | | |
| 10 | No. 2 | — | nylon/maleic acid (10 wt. %) | 0.7 | within ±10% |
| 11 | No. 26 | — | cellulose/benzamide (10 wt. %) | 0.5 | " |
| 12 | No. 72 | polypara- | nylon/methyl | 0.6 | " |

TABLE 2-continued

| Coloring matter (No. in Table 1) | Separating layer | Supplementary record layer polymer/polar compound | Contrast | Contrast change after durability test |
| --- | --- | --- | --- | --- |
| 13 Comparative Example | No. 74 | xylylene (300 Å) polyparaxylylene (300 Å) | texephthalate (10 wt. %) polyester/phthalic acid (5 wt. %) | 0.7 | " |
| 4 | No. 2 | — | — | 0.2 | 20% |
| 5 | No. 26 | — | — | 0.1 | 10% |
| 6 | No. 72 | — | — | 0.2 | 15% |
| 7 | No. 74 | — | — | 0.2 | 15% |

EXAMPLE 14

A 1.2 mm-thick optical disk substrate with an outer diameter of 130 mm and an inner diameter of 15 mm was provided on one face thereof with a spiral tracking groove having a width of 0.6 micron and a depth of 1100 Å at a pitch of 1.6 microns by reactive ion etching.

The face of the optical card substrate provided with the tracking groove was coated with a 4% solution in dichloromethane of the organic coloring matter No. 5 in Table 1 by means of a spin coater to form a 1000 Å-thick recording layer.

Then, the recording layer was coated with a 100 Å-thick layer of polystyrene as a separating layer and further laminated with a 30 micron-thick film of nylon in mixture with 10 wt. % of phthalic acid and then covered with a 1.2 mm-thick glass protective sheet with a diameter of 130 mm by the medium of a rubber-type hot melt adhesive ("MELT-LON 3S49" (trade name), mfd. by Diabond Kogyo K.K.) to prepare an optical disk.

The optical disk was loaded on an optical card evaluating apparatus ("OMS-1000" (trade name), mfd. by Nakamichi K.K.) and subjected to information recording by using a recording light beam with a wavelength of 830 nm, a beam diameter of 1.6 microns, and a power of 8.0 mW at a recording pulse width of 0.2 μs while rotating the optical disk at a linear speed of 7 m/sec. The recording light beam was incident from the side of the disk substrate.

The optical disk after the recording was irradiated with a reproducing light beam having a wavelength of 830 nm, a beam diameter of 1.6 microns and a power of 0.5 mW incident from the side of the disk substrate for measurement of a record contrast (RF output contrast). Further, the optical disk was subjected to a durability test by standing disk in an environment of a temperature of 50 degrees and 90% RH for 1000 hours. After standing, the disk was again subjected to reproduction and the change in reproduced signal contrast (RF output contrast) was evaluated.

The results are shown in Table 3 below.

Comparative Example 8

An optical disk was prepared in the same manner as in Example 14 except that the separating layer and supplementary record layer were omitted.

The resultant optical disk was evaluated in the same manner as in Example 14. The results are also shown in Table 3 below.

TABLE 3

| | Contrast | Contrast change after durability test |
| --- | --- | --- |
| Example 4 | 0.6 | within 10% |
| Comparative Example 8 | 0.3 | " |

What is claimed is:

1. An optical recording method comprising the steps of:

providing a record blank comprising a substrate, a recording layer comprising a colorant which exhibits a first absorption maximum at a first wavelength, and a supplementary recording layer laminated on the substrate, the supplementary recording layer containing a polymer and a low-molecular compound having a polar group; and irradiating the record blank with a recording light beam sufficient to locally form a mixture of material in the supplementary recording layer and the recording layer, the locally formed mixture being a co-melted mixture including colorant which non-reactively interacts with the polar group of the low-molecular compound to exhibit a second absorption maximum shifted to a shorter wavelength from the first wavelength of the first absorption maximum, thereby providing a difference in spectral characteristic detectable by a reproducing light beam.

2. The optical recording method according to claim 1, further comprising the steps of providing the record blank with a separating layer disposed between the recording layer and the supplementary recording layer, and wherein the irradiating step includes irradiating the record blank with a recording light sufficient to locally break the separating layer, thereby to allow colorant in the recording layer and polymer and low-molecular compound in the supplementary recording layer to interact each other to form a non-reactant co-melted mixture.

3. The optical recording method according to claim 1, wherein the colorant is a cationic colorant.

4. The optical recording method according to claim 1, wherein the colorant is a polymethine dye represented by the following formula (I):

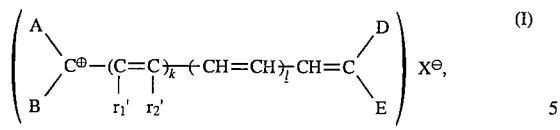 (I)

wherein A, B, D and E each represent a hydrogen atom or a group selected from a substituted or unsubstituted alkyl group, a substituted or unsubstituted alkenyl group, a substituted or unsubstituted aralkyl group, a substituted or unsubstituted aryl group, a substituted or unsubstituted styryl group and a substituted or unsubstituted heterocyclic group, $r_1'$ and $r_2'$ each represent a group selected from a hydrogen atom, a substituted or unsubstituted alkyl group, a substituted or unsubstituted cyclic alkyl group, a substituted or unsubstituted alkenyl group, a substituted or unsubstituted aralkyl group and a substituted or unsubstituted aryl group, and k represents 0 or 1, $\underline{l}$ represents 0, 1 or 2; and $X^\ominus$ represents an anion.

5. The optical recording method according to claim 1, wherein the colorant is a compound represented by any one of the following formulas (II), (III) and (IV):

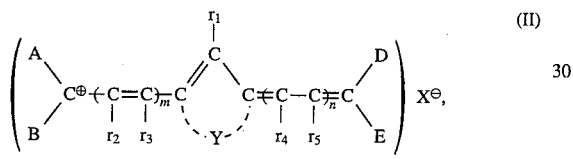 (II)

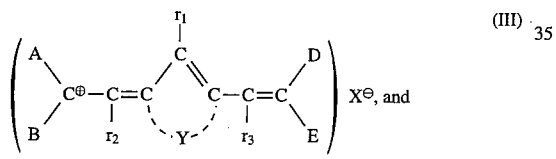 (III)

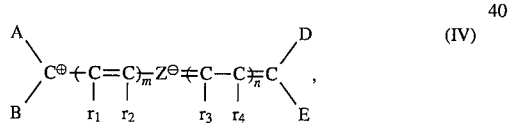 (IV)

wherein A, B, D and E each represent a hydrogen atom or a group selected from a substituted or unsubstituted alkyl group, a substituted or unsubstituted alkenyl group, a substituted or unsubstituted aralkyl group, a substituted or unsubstituted aryl group, a substituted or unsubstituted styryl group and a substituted or unsubstituted heterocyclic group; $X^\ominus$ represents an anion; $r_1$ to $r_5$ each represent a hydrogen atom, a halogen atom, a substituted or unsubstituted alkyl group or a substituted or unsubstituted aryl group; Y represents a divalent organic residue having a group of atoms necessary for completing a substituted or unsubstituted ring of 5 or 6 members; $z^\ominus$ represents

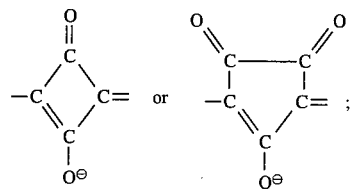

and m and n each represent 0, 1 or 2.

6. The optical recording method according to claim 1, wherein the colorant is a compound represented by any one of the following formulas (V), (IV) and (VII):

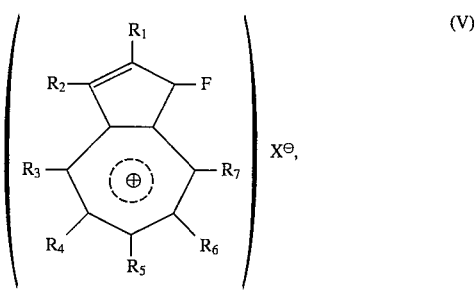 (V)

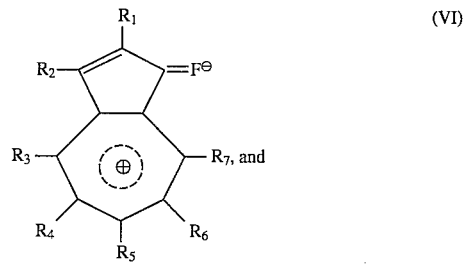 (VI)

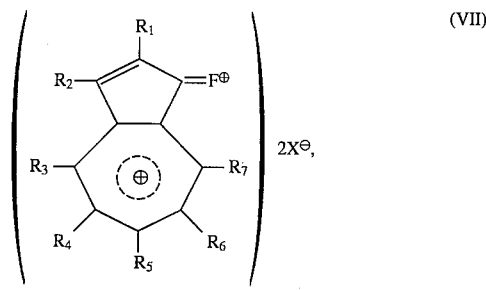 (VII)

wherein $R_1$ to $R_7$ each represent a hydrogen atom, a halogen atom or an organic residue capable of forming in combination a substituted or unsubstituted condensed ring; and F represents a divalent organic residue.

7. The optical recording method according to claim 1, wherein the colorant is a compound represented by an one of the following formulas (VIII), (IX), (X) and (XI):

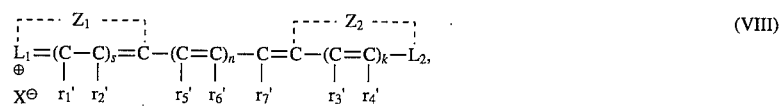 (VIII)

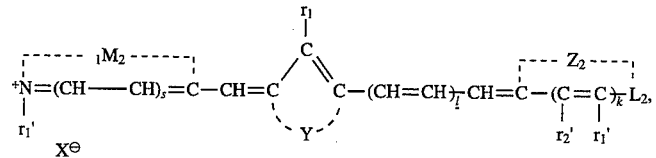

(IX)

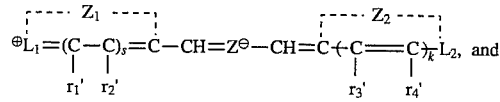

(X)

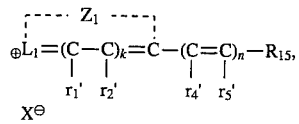

(XI)

wherein $L_1$ and $L_2$ each represent a substituted nitrogen atom, sulfur atom, oxygen atom, selenium atom or tellurium atom; $Z_1$ represents a group of atoms necessary for completing a pyrilium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or napthotelluropyrylium skeleton that may be substituted; $Z_2$ represents a group of atoms necessary for completing a pyran, thipyran, selenapyran, telluropyran, benzopyran, benzothiopyran, benzoselenapyran, benzotelluropyran, naphthopyran, naphthothiopyran, naphthoselenapyran or naphthotelluropyran skeleton that may be substituted; $R_{15}$ represents a substituted or unsubstituted aryl group or a substituted or unsubstituted heterocyclic group; $_1M_2$ represents a group of non-metallic atoms necessary for completing a nitrogen-containing heterocyclic group; $r_1'$ to $r_7'$ each represent a group selected from an hydrogen atom, a substituted or unsubstituted alkyl group, a substituted or unsubstituted cyclic alkyl group, a substituted or unsubstituted alkenyl group, a substituted or unsubstituted aralkyl group and a substituted or unsubstituted aryl group; $X^\ominus$ represents an anion; $r_1$ represents a hydrogen atom, a halogen atom, a substituted or unsubstituted alkyl group or a substituted or unsubstituted aryl group; Y represents a divalent organic residue having a group of atoms necessary for completing a substituted or unsubstituted ring of 5 or 6 members; $Z^\ominus$ represents

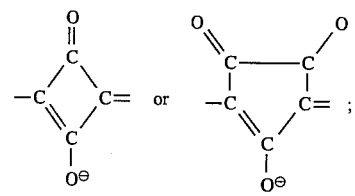

$k_1$ and s each represent 0 or 1; and $\underline{1}$ and n each represent 0, 1 or 2.

8. An optical reproducing method comprising the steps of:
providing an information record in which information is recorded, the information record comprising a substrate, a recording layer comprising a colorant which exhibits a first absorption maximum at a first wavelength, and a supplementary recording layer laminated on the recording layer, the supplementary recording layer containing a polymer and a low-molecular compound having a polar group, wherein local regions are formed corresponding to recorded information by a material mixture between the recording layer and the supplementary recording layer so as to provide a difference in spectral characteristic detectable by a reproducing light beam, and the local regions are formed as a co-melted mixture including colorant which is non-reactively interacted with a polar group of a low-molecular compound to exhibit a second absorption maximum shifted to a shorter wavelength from the first wavelength of the first absorption maximum; and irradiating the information record with a reproducing light beam and detecting a difference in spectral characteristic at regions where the co-melted mixture is formed, thereby reproducing the recorded information.

9. The optical reproducing method according to claim 8, further comprising the steps of providing the information record with a separating layer disposed between the recording layer and the supplementary record layer, and locally breaking the separating layer at the local regions to allow colorant in the recording layer and a polar group of a low-molecular compound of the supplementary record layer to contact each other, thereby to form a co-melted mixture.

10. The optical reproducing method according to claim 9, wherein the reproducing light beam has an intensity that it is sufficient to detect a different spectral characteristic of the co-melted mixture at a local region where the separating layer has been broken, but insufficient to break the separating layer at a non-record part.

11. An optical recording method comprising the steps of:
providing a record blank comprising a substrate, a recording layer comprising a colorant which exhibits a first absorption maximum at a first wavelength, and a supplementary recording layer laminated on the substrate, the supplementary recording layer in the record blank containing a polymer and a low-molecular compound having a polar group; and irradiating the record blank with a recording light beam sufficient to locally form a mixture of materials in the supplementary recording layer and the recording layer, the locally formed mixture being a co-melted mixture including colorant which is non-reactively interacted with the polar group of the low-molecular compound to exhibit a second absorption maximum shifted to a shorter wavelength from the first wavelength of the first absorption maximum, thereby providing a difference in spectral characteristic detectable by a reproducing light beam.

\* \* \* \* \*

UNITED STATES PATENT AND TRADEMARK OFFICE
CERTIFICATE OF CORRECTION

PATENT NO. : 5,572,492

DATED : November 5, 1996

INVENTOR(S) : YOSHIHIRO OGAWA

It is certified that error appears in the above-indentified patent and that said Letters Patent is hereby corrected as shown below:

COLUMN 3

Line 8, "length:" should read --length.--
Line 21, "O" should be deleted.

COLUMN 4

Line 46, "on" should read --or--.
Line 50, "matter" should read --matter,--.
Line 57, "getically, effected" should read --getically effected,--.

COLUMN 5

Line 25, "bond" should read --bonds--.
Line 66, "above" should read --above,--.

COLUMN 8

Line 12, "includes" should read --include--.

COLUMN 9

Line 60, "$Q^{\oplus}=(CH)_p-R_{10}qX^{\ominus}$ . . . . (8)" should read

--$Q^{\oplus}=(CH)_p-R_{10}qX^{\ominus}$ . . . . (8)--.

Line 67, "$Q^{\oplus}=(CH)_p-R_{11}qX^{\ominus}$ . . . . (9)" should read

--$Q^{\oplus}=(CH)_p-R_{11}qX^{\ominus}$ . . . . (9)--.

UNITED STATES PATENT AND TRADEMARK OFFICE
CERTIFICATE OF CORRECTION

PATENT NO. : 5,572,492

DATED : November 5, 1996

INVENTOR(S) : YOSHIHIRO OGAWA

It is certified that error appears in the above-indentified patent and that said Letters Patent is hereby corrected as shown below:

COLUMN 11

Line 9, "represents" should read --represent--.
Line 29, "groups," should read --group,--.
Line 33, "represents" should read --represent--.
Line 38, "grou," should read --group,--

COLUMN 14

Line 4, "naththoxazole," should read --naphthoxazole,--.
Line 23, "tungstate," should read --tungstate ion,--.

COLUMN 23

Table 1, Row 48, "-S-CH=C(CH$_3$)$_3$-" should read -- -S-CH=C(CH$_3$)- --.

COLUMN 31

Line 28, "melted, deformed" should read --melt, deform--.
Line 35, "contacts" should read --contact--.

COLUMN 33

Line 64, "3µn," should read --3µm,--.

UNITED STATES PATENT AND TRADEMARK OFFICE
CERTIFICATE OF CORRECTION

PATENT NO. : 5,572,492　　　　　Page 3 of 3

DATED : November 5, 1996

INVENTOR(S) : YOSHIHIRO OGAWA

It is certified that error appears in the above-indentified patent and that said Letters Patent is hereby corrected as shown below:

COLUMN 37

Line 55, "recording" should read --recording,--.

COLUMN 39

Line 18, "substrate-was" should read --substrate was--.

COLUMN 44

Line 54, "an" should read --any--.

COLUMN 45

Line 36, "an" should read --a--.

SHEET 4

Fig. 4, "TRANMITTANCE" should read --TRANSMITTANCE--.

Signed and Sealed this

Tenth Day of June, 1997

Attest:

BRUCE LEHMAN

Attesting Officer　　Commissioner of Patents and Trademarks